US008266061B2

(12) United States Patent
Ito et al.

(10) Patent No.: US 8,266,061 B2
(45) Date of Patent: Sep. 11, 2012

(54) APPARATUS AND METHOD FOR DIGITAL CONTENT EDITING

(75) Inventors: Satoshi Ito, Tokyo (JP); Hideyuki Aisu, Tokyo (JP); Tooru Kamibayashi, Tokyo (JP); Koichiro Akiyama, Tokyo (JP); Shinichiro Hamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/075,426

(22) Filed: Mar. 9, 2005

(65) Prior Publication Data

US 2006/0080262 A1 Apr. 13, 2006

(30) Foreign Application Priority Data

Sep. 30, 2004 (JP) ................................. 2004-287626

(51) Int. Cl.
*G06F 21/00* (2006.01)
*G06F 7/04* (2006.01)
*G06F 17/30* (2006.01)
*H04N 7/16* (2011.01)

(52) U.S. Cl. ........................................ 705/59; 726/27
(58) Field of Classification Search ...................... 705/59
See application file for complete search history.

(56) References Cited

U.S. PATENT DOCUMENTS

| | | | | |
|---|---|---|---|---|
| 5,138,712 A * | 8/1992 | Corbin | ............................. | 726/30 |
| 5,629,980 A * | 5/1997 | Stefik et al. | ..................... | 705/54 |
| 5,659,539 A * | 8/1997 | Porter et al. | ................... | 709/231 |
| 5,659,793 A * | 8/1997 | Escobar et al. | ............... | 715/202 |
| 5,712,713 A * | 1/1998 | Hamanaka et al. | ............ | 358/451 |
| 5,715,403 A * | 2/1998 | Stefik | .............................. | 705/44 |
| 5,724,605 A * | 3/1998 | Wissner | ......................... | 715/202 |
| 5,745,645 A * | 4/1998 | Nakamura et al. | ............ | 386/233 |
| 5,752,029 A * | 5/1998 | Wissner | ................................. | 1/1 |
| 5,754,657 A * | 5/1998 | Schipper et al. | ............... | 380/258 |
| 5,754,851 A * | 5/1998 | Wissner | ................................ | 1/1 |

(Continued)

FOREIGN PATENT DOCUMENTS

CN 1487456 A 4/2004

(Continued)

OTHER PUBLICATIONS

ISO/IEC 2100-5, "Information Technology-Multimedia Framework (MPEG-21)—Part 5: Rights Expression Language", First Edition, Apr. 1, 2004.

(Continued)

*Primary Examiner* — James Kramer
*Assistant Examiner* — Nancy Loan Le
(74) *Attorney, Agent, or Firm* — Oblon, Spivak, McClelland, Maier & Neustadt, L.L.P.

(57) ABSTRACT

A digital content editing apparatus that edits a content having license information defining a grant for a reusing operation or a multiple content including a plurality of the contents includes: a reuse license processor that obtains a constraint indicative of a condition on reuse between a content or the multiple content and a content other than the content or the multiple content from the license information of the content or the multiple content; an instruction generator that generates an operation execution instruction of reusing the content or the multiple content according to the constraint obtained by the reuse license processor; a reusing unit that reuses the content or the multiple content based on the operation execution instruction generated by the instruction generator; and an editor that edits the content or the multiple content reused by the reusing unit.

14 Claims, 36 Drawing Sheets

U.S. PATENT DOCUMENTS

| | | | | | |
|---|---|---|---|---|---|
| 5,765,152 | A * | 6/1998 | Erickson | | 1/1 |
| 5,826,102 | A * | 10/1998 | Escobar et al. | | 715/202 |
| 5,864,682 | A * | 1/1999 | Porter et al. | | 709/247 |
| 5,892,900 | A * | 4/1999 | Ginter et al. | | 726/26 |
| 5,917,912 | A * | 6/1999 | Ginter et al. | | 713/187 |
| 5,923,869 | A * | 7/1999 | Kashiwagi et al. | | 713/501 |
| 5,991,444 | A * | 11/1999 | Burt et al. | | 382/232 |
| 6,006,242 | A * | 12/1999 | Poole et al. | | 715/209 |
| 6,025,853 | A * | 2/2000 | Baldwin | | 345/506 |
| 6,029,182 | A * | 2/2000 | Nehab et al. | | 715/205 |
| 6,034,832 | A * | 3/2000 | Ichimura et al. | | 360/60 |
| 6,064,796 | A * | 5/2000 | Nakamura et al. | | 386/233 |
| 6,097,814 | A * | 8/2000 | Mochizuki | | 380/44 |
| 6,097,877 | A * | 8/2000 | Katayama et al. | | 386/314 |
| 6,154,207 | A * | 11/2000 | Farris et al. | | 715/210 |
| 6,154,223 | A * | 11/2000 | Baldwin | | 345/506 |
| 6,223,347 | B1 * | 4/2001 | Watanabe et al. | | 725/139 |
| 6,226,618 | B1 * | 5/2001 | Downs et al. | | 705/51 |
| 6,240,185 | B1 * | 5/2001 | Van Wie et al. | | 380/232 |
| 6,253,193 | B1 * | 6/2001 | Ginter et al. | | 705/57 |
| 6,263,335 | B1 * | 7/2001 | Paik et al. | | 1/1 |
| 6,278,448 | B1 * | 8/2001 | Brown et al. | | 715/866 |
| 6,327,628 | B1 * | 12/2001 | Anuff et al. | | 719/311 |
| 6,363,488 | B1 * | 3/2002 | Ginter et al. | | 726/1 |
| 6,389,402 | B1 * | 5/2002 | Ginter et al. | | 705/51 |
| 6,397,231 | B1 * | 5/2002 | Salisbury et al. | | 715/234 |
| 6,427,140 | B1 * | 7/2002 | Ginter et al. | | 705/80 |
| 6,429,879 | B1 * | 8/2002 | Sturgeon et al. | | 715/723 |
| 6,445,795 | B1 * | 9/2002 | Sako et al. | | 380/201 |
| 6,449,627 | B1 * | 9/2002 | Baer et al. | | 715/206 |
| 6,460,023 | B1 * | 10/2002 | Bean et al. | | 705/54 |
| 6,477,341 | B2 * | 11/2002 | Nomura et al. | | 399/81 |
| 6,477,649 | B2 * | 11/2002 | Kambayashi et al. | | 726/27 |
| 6,507,410 | B1 * | 1/2003 | Robertson et al. | | 358/1.18 |
| 6,535,919 | B1 * | 3/2003 | Inoue et al. | | 709/229 |
| 6,587,837 | B1 * | 7/2003 | Spagna et al. | | 705/52 |
| 6,611,812 | B2 * | 8/2003 | Hurtado et al. | | 705/51 |
| 6,658,568 | B1 * | 12/2003 | Ginter et al. | | 713/193 |
| 6,681,015 | B1 * | 1/2004 | Hioki et al. | | 380/231 |
| 6,832,319 | B1 * | 12/2004 | Bell et al. | | 713/193 |
| 6,873,975 | B1 * | 3/2005 | Hatakeyama et al. | | 705/51 |
| 6,876,984 | B2 * | 4/2005 | Tadayon et al. | | 705/51 |
| 6,907,184 | B1 * | 6/2005 | Yokota et al. | | 386/52 |
| 6,948,070 | B1 * | 9/2005 | Ginter et al. | | 713/193 |
| 6,980,984 | B1 * | 12/2005 | Huffman et al. | | 707/3 |
| 7,043,454 | B2 * | 5/2006 | Powell | | 705/59 |
| 7,051,212 | B2 * | 5/2006 | Ginter et al. | | 713/193 |
| 7,073,073 | B1 * | 7/2006 | Nonaka et al. | | 713/193 |
| 7,076,652 | B2 * | 7/2006 | Ginter et al. | | 713/153 |
| 7,124,443 | B2 * | 10/2006 | Ishibashi et al. | | 726/26 |
| 7,143,067 | B1 * | 11/2006 | Cheston et al. | | 705/59 |
| 7,159,244 | B2 * | 1/2007 | Matsushima et al. | | 726/30 |
| 7,178,144 | B2 * | 2/2007 | Melchione et al. | | 717/172 |
| 7,188,224 | B2 * | 3/2007 | Ohta et al. | | 711/163 |
| 7,213,005 | B2 * | 5/2007 | Mourad et al. | | 705/64 |
| 7,213,268 | B2 * | 5/2007 | Stelling et al. | | 726/26 |
| 7,237,123 | B2 * | 6/2007 | LeVine et al. | | 713/193 |
| 7,260,721 | B2 * | 8/2007 | Tanaka et al. | | 713/170 |
| 7,328,453 | B2 * | 2/2008 | Merkle et al. | | 726/23 |
| 7,336,787 | B2 * | 2/2008 | Unger et al. | | 380/217 |
| 7,376,624 | B2 * | 5/2008 | Cochran et al. | | 705/53 |
| 7,428,512 | B2 * | 9/2008 | Nozaki et al. | | 705/57 |
| 7,467,100 | B2 * | 12/2008 | Matsumori | | 705/26.8 |
| 7,552,093 | B2 * | 6/2009 | Levin et al. | | 705/59 |
| 7,558,759 | B2 * | 7/2009 | Valenzuela et al. | | 705/50 |
| 7,565,697 | B2 * | 7/2009 | LeVine et al. | | 726/26 |
| 7,587,368 | B2 * | 9/2009 | Felsher | | 705/65 |
| 7,607,017 | B2 * | 10/2009 | Pelly et al. | | 713/176 |
| 7,702,101 | B2 * | 4/2010 | Malcolm et al. | | 380/37 |
| 7,801,825 | B2 * | 9/2010 | Kranzley et al. | | 705/67 |
| 7,836,311 | B2 * | 11/2010 | Kuriya et al. | | 713/185 |
| 7,904,390 | B2 * | 3/2011 | Yui | | 705/52 |
| 7,934,263 | B2 * | 4/2011 | Singer et al. | | 726/26 |
| 8,090,619 | B1 * | 1/2012 | Hunter et al. | | 705/26.1 |
| 2001/0000191 | A1 * | 4/2001 | Barkan et al. | | 705/59 |
| 2001/0032189 | A1 * | 10/2001 | Powell | | 705/59 |
| 2002/0038451 | A1 * | 3/2002 | Tanner et al. | | 717/105 |
| 2002/0040435 | A1 | 4/2002 | Hamada et al. | | |
| 2002/0077986 | A1 * | 6/2002 | Kobata et al. | | 705/52 |
| 2002/0078105 | A1 * | 6/2002 | Hamada et al. | | 707/530 |
| 2002/0083324 | A1 * | 6/2002 | Hirai | | 713/176 |
| 2002/0092021 | A1 * | 7/2002 | Yap et al. | | 725/55 |
| 2002/0107809 | A1 * | 8/2002 | Biddle et al. | | 705/59 |
| 2002/0114466 | A1 * | 8/2002 | Tanaka et al. | | 380/232 |
| 2002/0138557 | A1 * | 9/2002 | Mukaiyama et al. | | 709/203 |
| 2002/0152171 | A1 * | 10/2002 | Okamoto et al. | | 705/51 |
| 2002/0161830 | A1 * | 10/2002 | Mukaiyama et al. | | 709/203 |
| 2002/0161831 | A1 * | 10/2002 | Nakaoka et al. | | 709/203 |
| 2002/0184517 | A1 * | 12/2002 | Tadayon et al. | | 713/200 |
| 2002/0186408 | A1 * | 12/2002 | Nakaoka et al. | | 358/1.15 |
| 2002/0194267 | A1 * | 12/2002 | Flesner et al. | | 709/203 |
| 2002/0196273 | A1 * | 12/2002 | Krause | | 345/738 |
| 2003/0004888 | A1 * | 1/2003 | Kambayashi et al. | | 705/59 |
| 2003/0028489 | A1 * | 2/2003 | Williamson | | 705/59 |
| 2003/0060910 | A1 * | 3/2003 | Williams et al. | | 700/91 |
| 2003/0084341 | A1 * | 5/2003 | Ramachandran et al. | | 713/201 |
| 2003/0103647 | A1 * | 6/2003 | Rui et al. | | 382/103 |
| 2003/0125976 | A1 | 7/2003 | Nguyen et al. | | |
| 2003/0154378 | A1 * | 8/2003 | Hirano | | 713/176 |
| 2004/0025058 | A1 * | 2/2004 | Kuriya et al. | | 713/201 |
| 2004/0103303 | A1 * | 5/2004 | Yamauchi et al. | | 713/200 |
| 2004/0105544 | A1 * | 6/2004 | Haneda et al. | | 380/231 |
| 2004/0117619 | A1 * | 6/2004 | Singer et al. | | 713/156 |
| 2004/0210765 | A1 * | 10/2004 | Erickson | | 713/200 |
| 2004/0220881 | A1 * | 11/2004 | Powell | | 705/59 |
| 2005/0125358 | A1 * | 6/2005 | Levin et al. | | 705/59 |
| 2005/0125359 | A1 * | 6/2005 | Levin et al. | | 705/59 |
| 2005/0152672 | A1 * | 7/2005 | Kanai et al. | | 386/52 |
| 2007/0136113 | A1 * | 6/2007 | Wilson | | 705/7 |
| 2008/0064326 | A1 * | 3/2008 | Foster et al. | | 455/3.06 |
| 2009/0216769 | A1 * | 8/2009 | Bellwood et al. | | 707/9 |
| 2009/0296929 | A1 * | 12/2009 | Wachtfogel et al. | | 380/213 |
| 2010/0226525 | A1 * | 9/2010 | Levy et al. | | 382/100 |

FOREIGN PATENT DOCUMENTS

| | | | |
|---|---|---|---|
| EP | 1 457 886 A1 * | 9/2004 | |
| JP | 2000-113066 A * | 4/2000 | |
| JP | 2001/282948 | 10/2001 | |
| JP | 2001-525951 | 12/2001 | |
| JP | 2002-41966 | 2/2002 | |
| JP | 2002-109103 | 4/2002 | |
| JP | 2004-13493 | 1/2004 | |
| JP | 2004-70646 A * | 3/2004 | |
| WO | WO 03/052603 A1 | 6/2003 | |

OTHER PUBLICATIONS

ISO/IEC 2100-2, "Information Technology-Multimedia Framework (MPEG-21)—Part 2: Digital Item Declaration", First Edition, Mar. 15, 2003.

* cited by examiner

FIG.2

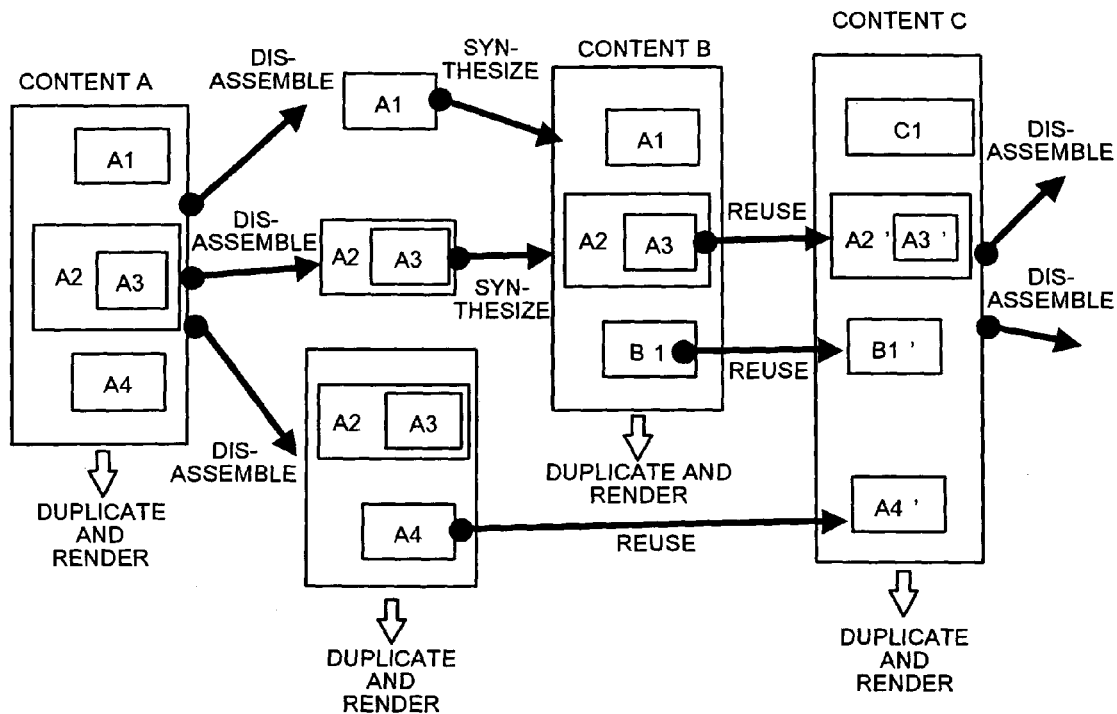

FIG.3A

```
<!--CONSTRAINT GRANT OPERATION-->
<xs:element name="adaptWithConstraint" type="AdaptWithConstraint"
substitutionGroup="r:right"/>

<xs:complexType name="AdaptWithConstraint">
    <xs:complexContent>
        <xs:extension base="r:Right">
            <xs:sequence>
                <!--COMPLEMENTARY CONSTRAINT RELATION-->
                <xs:element ref="complemantaryConstraint"minOccurs="0"/>
                <!--EXCLUSIVE CONSTRAINT RELATION-->
                <xs:element ref="exclusiveConstraint"minOccurs="0"/>
            </xs:sequence>
        </xs:extension>
    </xs:complexContent>
</xs:complexType>
```

```
<!-- COMPLEMENTARY CONSTRAINT -->                                           321
<xs:element name="complemantaryConstraint" type="ComplemantaryConstraint"
substitutionGroup="r:licensePart"/>
<xs:complexType name="ComplemantaryConstraint ">
    <xs:complexContent>
        <xs:extension base="r:LicensePart">
            <xs:sequence>                          322
                <xs:element ref="r:resource"/>
                <xs:choice>                                              323
                    <xs:element name="spacialConstraint">
                        <xs:simpleType>
                            <xs:restriction base="xs:string">
                                <xs:enumeration value="above"/>
                                <xs:enumeration value="below"/>
                                <xs:enumeration value="rightSide"/>
                                <xs:enumeration value="leftSide"/>
                                <xs:enumeration value="backward"/>
                                <xs:enumeration value="forward"/>
                                <xs:enumeration value="anywhere"/>
                                <xs:enumeration value="predefined stylesheet"/>
                            </xs:restriction>
                        </xs:simpleType>
                    </xs:element>
                    <xs:element name="structuralConstraint">
                        <xs:simpleType>                                      324
                            <xs:restriction base="xs:string">
                                <xs:enumeration value="isContained"/>
                                <xs:enumeration value="isPartOf"/>
                            </xs:restriction>
                        </xs:simpleType>
                    </xs:element>
                </xs:choice>
            </xs:sequence>
        </xs:extension>
    </xs:complexContent>
</xs:complexType>
```

FIG.3C

```
<!-- EXCLUSIVE CONSTRAINT -->                                              ⌐331
<xs:element name="exclusiveConstraint" type="ExclusiveConstraint"
substitutionGroup="r:licensePart"/>
   <xs:complexType name="ExclusiveConstraint">
      <xs:complexContent>
         <xs:extension base="r:LicensePart">
            <xs:sequence>                                        ⌐332
               <xs:element ref="r:resource"/>
               <xs:choice>
                  <xs:element name="exclusiveConstraint">
                     <xs:simpleType>                              ⌐333
                        <xs:restriction base="xs:string">
                           <xs:enumeration value="exclusive"/>
                        </xs:restriction>
                     </xs:simpleType>
                  </xs:element>
               </xs:choice>
            </xs:sequence>
         </xs:extension>
      </xs:complexContent>
   </xs:complexType>
```

FIG.5B

```
<?xml version="1.0" encoding="UTF-8"?>
<didl:DIDL>
    <didl:Item id="pamphlet001">
        <didl:Descriptor>
            <didl:Statement mimeType="text/xml">
                <r:license licenseId="L-Pamphlet001">
                       :
                </r:license>
            </didl:Statement>
        </didl:Descriptor>
        <didl:Item id="PromotionVideo001 ">                                   ─── 521
            <didl:Descriptor>
                <didl:Statement mimeType="text/xml">
                    <r:license licenseId="L-PromotionVideo001">   ─── 525
                          :
                    </r:license>
                </didl:Statement>
            </didl:Descriptor>
            <didl:Component>
                <didl:Resource ref="PromotionVideo001.mpg" mimeType="video/mpeg"/>
            </didl:Component>
        </didl:Item>
        <didl:Item id="comment001">                                           ─── 522
            <didl:Descriptor>
                <didl:Statement mimeType="text/xml">
                    <r:license licenseId="L-comment001">          ─── 526
                          :
                    </r:license>
                </didl:Statement>
            </didl:Descriptor>
            <didl:Component>
                <didl:Resource ref="comment001.rtx" mimeType="text/richtext"/>
            </didl:Component>
        </didl:Item>
        <didl:Item id="coupon001">                                            ─── 523
            <didl:Descriptor>
                <didl:Statement mimeType="text/xml">
                    <r:license licenseId="L-coupon001">           ─── 527
                          :
                    </r:license>
                </didl:Statement>
            </didl:Descriptor>
            <didl:Component>
                <didl:Resource ref="coupon.jpg" mimeType="image/jpeg"/>
            </didl:Component>
        </didl:Item>
        <didl:Item id="comment002">                                           ─── 524
            <didl:Descriptor>
                <didl:Statement mimeType="text/xml">
                    <r:license licenseId="L-comment002">          ─── 528
                          :
                    </r:license>
                </didl:Statement>
            </didl:Descriptor>
            <didl:Component>
                <didl:Resource ref="comment002.rtx" mimeType="text/richtext"/>
            </didl:Component>
        </didl:Item>
    </didl:Item>
</didl:DIDL>
```

FIG.6A

```
<?xml version="1.0" encoding="UTF-8"?>
<!--=LICENSE INFORMATION OF PromotionVIdeo001=-->
<r:license  licensetID ="L-PromotionVideo001">
     <r:grantgroup>
          <!-- ============ REPRODUCTION LICENSE ============ -->
          <r:grant>
               <!--= USE RIGHT HOLDER =-->
               <r:keyHolder />
               <!--= LICENSING OPERATION =-->
               < mx :play/>
               <!--= USE CONDITIONS =-->
               <r: validityInterval >
                    <r:notBeforer >2004-01-01T00:00:00</r:notBeforer>
                    <r:notAfter >2054-12-31T12:59:59</r:notAfter>
               </r:validityInterval>
          </r:grant>
          <!-- ============  REUSE LICENSE  ============ -->
          <r:grant>
               <!--=USE RIGHT HOLDER=-->
               <r:keyHolder/>
               <!--=LICENSING OPERATION=-->         612
               < mx :adapt/>
               <!--= USE CONDITIONS =-->
               <r:validityInterval>
                    <r:notBeforer> 2004-01-01T00:00:00</r:notBeforer>
                    <r:notAfter>2004-12-31T12:59:59</r:notAfter>
               </r:validityInterval>
          </r:grant>
     </r:grantgroup>
</r:license>
```

```xml
<?xml version="1.0" encoding="UTF-8"?>
<!--=LICENSE INFORMATION OFcomment001=-->
<r:license licensetID ="L-comment001">
    <r:grantgroup>
        <!-- ========= RENDERING LICENSE   ========== -->
        <r:grant>
            <!--=USE RIGHT HOLDER=-->
            <r:keyHolder/>
            <!--=LICENSING OPERATION=-->
            <mx:play/>
            <!--=USE CONDITIONS =-->
            <r:validityInterval>
                <r:notBeforer>2004-01-01T00:00:00</r:notBeforer>
                <r:notAfter>2054-12-31T12:59:59</r:notAfter>
            </r:validityInterval>
        </r:grant>
        <!-- ========= REUSE LICENSE ========= -->
        <r:grant>
            <!--=USE RIGHT HOLDER=-->
            <r:keyHolder/>
            <!--= LICENSING OPERATION=-->
            < adaptWithConstraint >
                <complemantaryConstraint>
                    <r:digitalReference>
                        <r:nonSecureIndirect id="PromotionVideo001"/>
                    </r:digitalReference>
                    <spacialConstraint>below</spacialConstraint>
                </complemantaryConstraint>
            </adaptWithConstraint>
            <!--= USE CONDITIONS = -->
            <r:validityInterval>
                <r:notBeforer>2004-01-01T00:00:00</r:notBeforer>
                <r:notAfter>2004-12-31T12:59:59</r:notAfter>
            </r:validityInterval>
        </r:grant>
    </r:grantgroup>
</r:license>
```

FIG.6C

```xml
<?xml version="1.0" encoding="UTF-8"?>
<!--=LICENSE INFORMATION OFcoupon001 =-->
<r:license licensetID ="L-coupon001">
   <r:grantgroup>
      <!-- ========== RENDERING LICENSE  ========== -->
      <r:grant>
         <!--=USE RIGHT HOLDER =-->
         <r:keyHolder/>
         <!--=LICENSING OPERATION =-->
         <mx:play/>
         <!--= USE CONDITIONS =-->
         <r:validityInterval>
            <r:notBeforer>2004-01-01T00:00:00</r:notBeforer>
            <r:notAfter>2054-12-31T12:59:59</r:notAfter>
         </r:validityInterval>
      </r:grant>
      <!-- ========== REUSE LICENSE ========== -->
      <r:grant>
         <!--=USE RIGHT HOLDER =-->
         <r:keyHolder/>
         <!--=LICENSING OPERATION =-->
         <adaptWithConstraint>
            <complemantaryConstraint>
                <r:digitalReference>
                   <r:nonSecureIndirect id="comment001"/>
                </r:digitalReference>
                <spacialConstraint>rightside</spacialConstraint>
            </complemantaryConstraint>
            <exclusiveConstraint>
                <r:digitalReference>
                   <r:nonSecureIndirect id="coupon002"/>
                </r:digitalReference>
                <generalConstraint>exclusive</generalConstraint>
            </exclusiveConstraint>
         </adaptWithConstraint>
         <!--= USE CONDITIONS =-->
         <r:validityInterval>
            <r:notBeforer>2004-01-01T00:00:00</r:notBeforer>
            <r:notAfter>2004-12-31T12:59:59</r:notAfter>
         </r:validityInterval>
      </r:grant>
   </r:grantgroup>
</r:license>
```

FIG.6D

```
<?xml version="1.0" encoding="UTF-8"?>
<!--=LICENSE INFORMATION OFcomment002 =-->
<r:license licensetID ="L-comment002">              641
    <r:grantgroup>
        <!-- ============ RENDERING LICENSE ============ -->
        <r:grant>
            <!--= USE RIGHT HOLDER =-->
            <r:keyHolder/>
            <!--= LICENSING OPERATION =-->
            <mx:play/>
            <!--= USE CONDITIONS =-->
            <r:validityInterval>
                <r:notBeforer>2004-01-01T00:00:00</r:notBeforer>
                <r:notAfter>2054-12-31T12:59:59</r:notAfter>
            </r:validityInterval>
        </r:grant>
        <!-- ============ REUSE LICENSE ============ -->
        <r:grant>
            <!--= USE RIGHT HOLDER =-->
            <r:keyHolder/>                                642
            <!--= LICENSING OPERATION =-->
            ┌─────────────────────────────────────────────┐
            │ <adaptWithConstraint>                       │
            │     <complemantaryConstraint>               │
            │         <r:digitalReference>                │
            │             <r:nonSecureIndirect id="PromotionVideo001"/> │
            │         </r:digitalReference>               │
            │         <spacialConstraint>below</spacialConstraint> │
            │     </complemantaryConstraint>              │
            │ </adaptWithConstraint>                      │
            └─────────────────────────────────────────────┘
            <!--= USE CONDITIONS =-->
            <r:validityInterval>
                <r:notBeforer>2004-01-01T00:00:00</r:notBeforer>
                <r:notAfter>2004-12-31T12:59:59</r:notAfter>
            </r:validityInterval>
        </r:grant>
    </r:grantgroup>
</r:license>
```

FIG.7

| OPERATION | OPPOSITE OPERATION |
|---|---|
| above | below |
| below | above |
| rightSide | leftSide |
| leftSide | rightSide |
| foreward | backward |
| backward | foreward |
| after | before |
| before | after |
| isContained | isPartOf |
| isPartOf | isContained |

FIG.8

| Right | ID1 | ID2 | Op-Type | Existence Check |
|---|---|---|---|---|
| adaptWithConstraint | A | B | below | false |
| adaptWithConstraint | A | B | after | false |
| adaptWithConstraint | C | D | exclusive | false |
| adapt | D | nil | nil | false |

FIG.11

| COMMAND STATEMENT |
|---|
| (new(PromotionVideo001))(new(comment001) below tmp(PromotionVideo001)) |
| (new(comment001) below (exist(PromotionVideo001)) |
| (new(PromotionVideo001))(new(comment001) below tmp(PromotionVideo001)) (new(coupon1)rightside tmp(comment001)) |

120

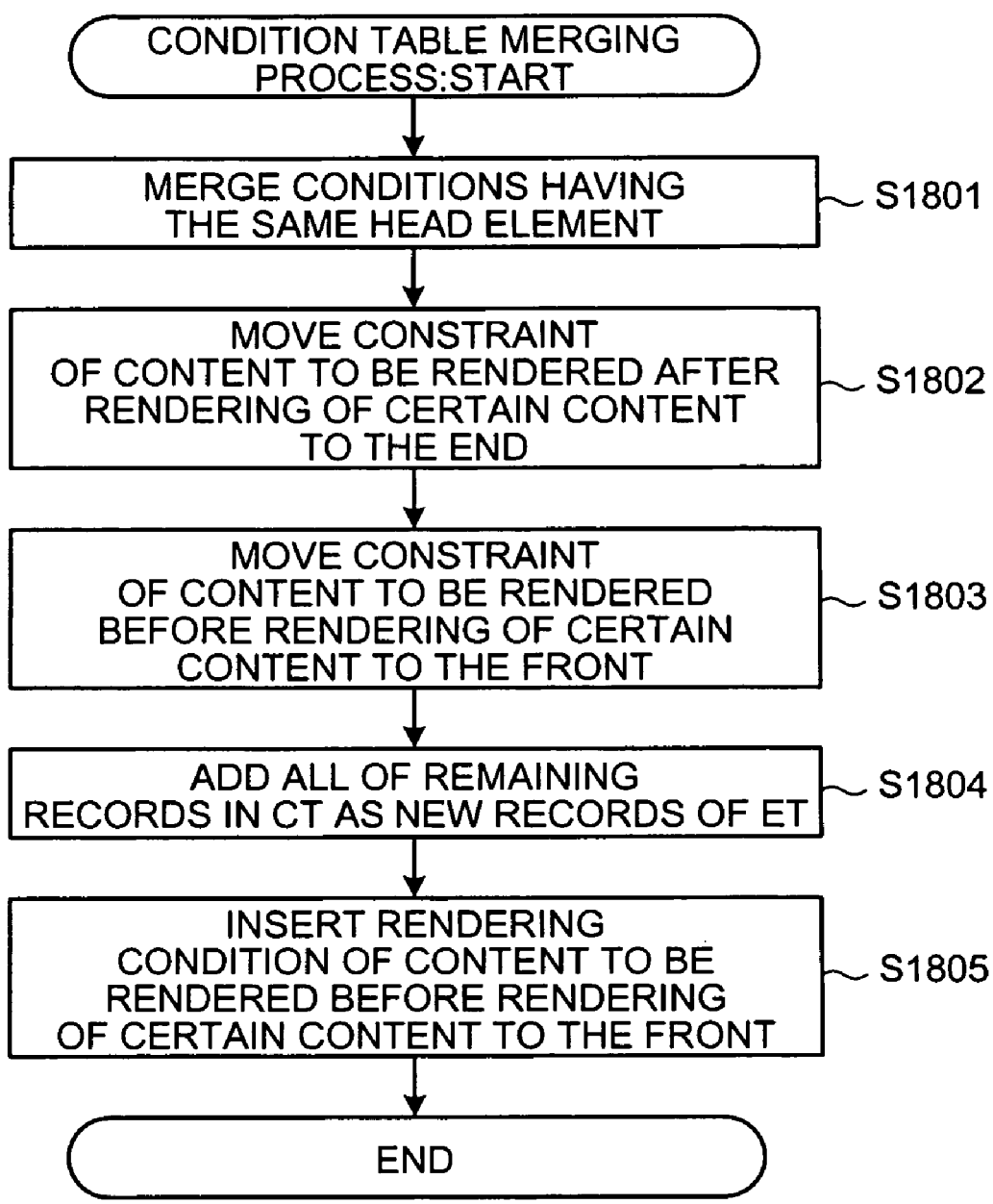

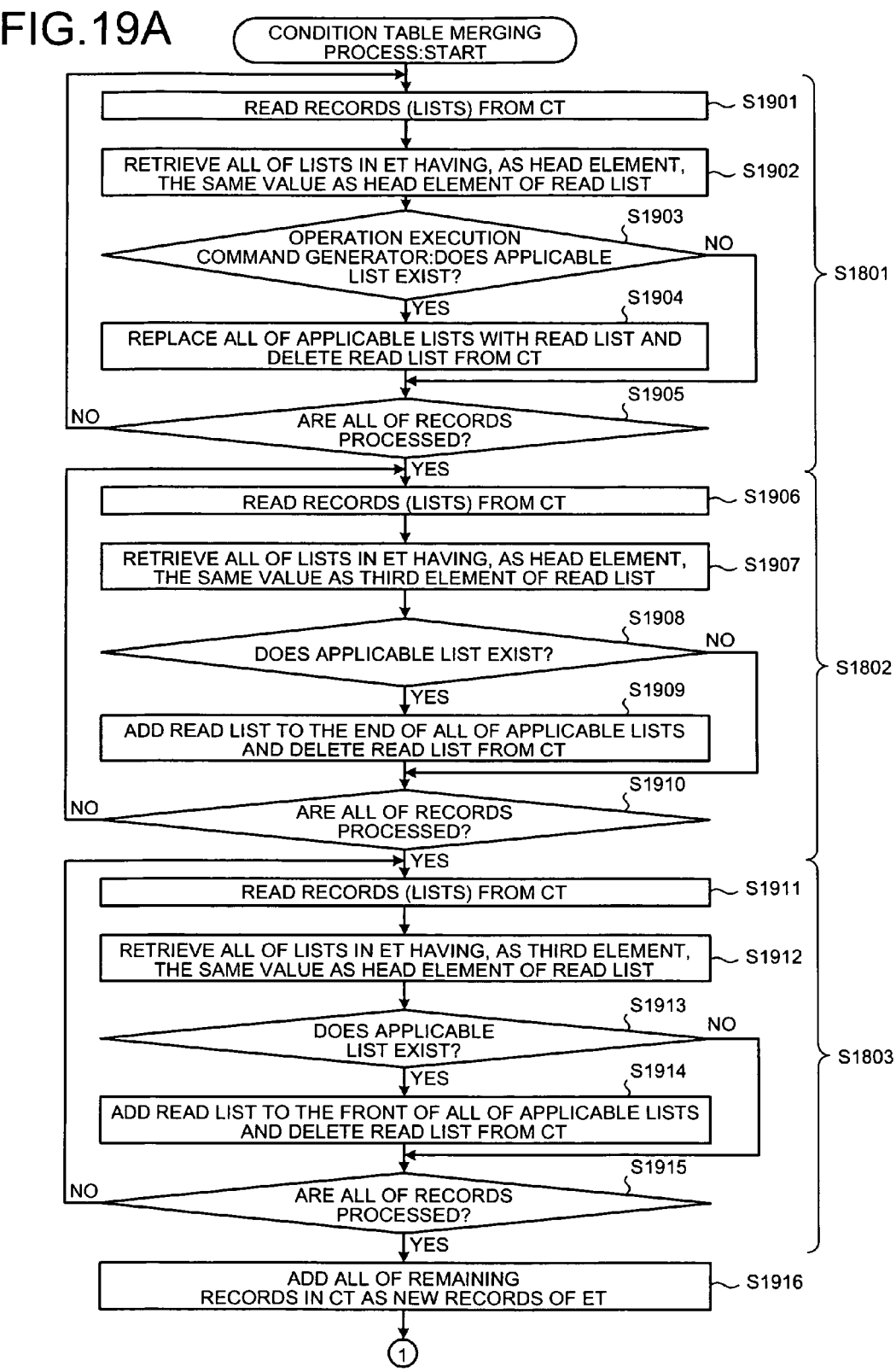

APPARATUS AND METHOD FOR DIGITAL CONTENT EDITING

CROSS-REFERENCE TO RELATED APPLICATION

This application is based upon and claims the benefit of priority from the prior Japanese Patent Application No. 2004-287626, filed on Sep. 30, 2004; the entire contents of which are incorporated herein by reference.

BACKGROUND OF THE INVENTION

1) Field of the Invention

The present invention relates to technology for digital content editing.

2) Description of the Related Art

In recent years, a number of Digital Rights Managements (DRMs) as a technique for protecting the copyright of a digital work are developed. In particular, commercial digital contents such as movies and music are developed in such a manner that strong copyright protection is advantageous for content providers as typified by Digital Versatile Discs (DVDs).

A copyright protecting function in the techniques provides a very rigid, strong mechanism to address a strong demand for copy prevention of a digital content and limits the flexibility of the users on digital contents more than analog contents.

The Japanese Copyright Law includes the regulation of so-called "fair-use" that a work can be used, for example, copied or cited, for private use without permission of the author. However, as described above, the flexibility of the users on digital works is restricted due to the copy protection. Consequently, the user cannot copy or cite a digital work even for private use and the fair-use on digital works is in increasing demand.

On the other hand, under present circumstances, little attention is paid to the copyright protection on non-commercial contents such as business documents, product catalogs, personal homepages, and e-mails which are reused or subjected to secondary process on a daily basis, so that contents cannot be safely distributed.

Under such circumstances, the international standardization activities such as ISO/IEC 21000 (MPEG 21) aiming at distribution and management of digital contents in various forms are underway. In MPEG21, a language (DIDL: Digital Item Declaration Language) for expressing a multiple content constructed by combination/coupling of a plurality of contents is standardized. It enables a multiple content constructed by a plurality of contents as components to be handled. Further, Rights Expression Language (REL) enabling flexible license description is standardized. A supporting method for describing a license with the REL, for example, is proposed in United States Patent Application Publication No. US2003/0125976.

Japanese Patent Application Laid-open No. 2002-109103 discloses a technique of dividing a content into parts, distributing the parts, allowing the parts to be reused as materials, reasonably charging the user for the use of the material contents, and assuring payment to the usage of the contents.

When a multiple content is to be distributed and reused, however, each of the components of the multiple content may be singly distributed and reused as a content or may be combined with another content and the resultant is used. In such a case, when a component is singly used, context information such as positioning of a particular component in a whole content and a relation with another component may be lost. Then, the original intension of the author might be expressed wrongly or transmitted as nonsense information.

When distribution of digital contents that can be reused more easily is considered, such a situation becomes a big problem that prevents sound reuse of a content.

In the DIDL of MPEG 21, the structural information of a multiple content can be expressed. However, when a multiple content is divided and parts of the content are distributed, the parts cannot be reconstructed to the original structure. In the technique of United States Patent Application Publication No. US2003/0125976 using REL of MPEG21, a use license can be set for each of components of a multiple content but a license including the relation among contents cannot be described.

In the technique of Japanese Patent Application Laid-open No. 2002-109103, even when a content is singly distributed, the right of the author to receive proper consideration can be protected but context information initially set by the author cannot be protected.

SUMMARY OF THE INVENTION

The present invention has been achieved in order to solve the above problems.

According to one aspect of the present invention, a digital content editing apparatus that edits a content having license information defining a grant for a reusing operation or a multiple content including a plurality of the contents, includes: a reuse license processor that obtains a constraint indicative of a condition on reuse between the content or the multiple content and a content other than the content or the multiple content from the license information of the content or the multiple content; an instruction generator that generates an operation execution instruction of reusing the content or the multiple content according to the constraint obtained by the reuse license processor; a reusing unit that reuses the content or the multiple content based on the operation execution instruction generated by the instruction generator; and an editor that edits the content or the multiple content reused by the reusing unit.

According to another aspect of the present invention, a digital content editing method of editing a content having license information defining a grant for a reusing operation or a multiple content including a plurality of the contents, includes: a reuse license processing that obtains a constraint indicative of a condition on reuse between the content or the multiple content and a content other than the content or the multiple content from the license information of the content or the multiple content; an operation execution instruction generation that generates an operation execution instruction of reusing the content or the multiple content according to the constraint obtained by the reuse license processing; a material reuse that reuses the content or the multiple content based on the operation execution instruction generated by the operation execution instruction generation; and an editing that edits the content or the multiple content reused by the material reuse.

According to still another aspect of the present invention, a digital content editing computer program product having a computer readable medium including programmed instructions for editing a content having license information defining a grant for a reusing operation or a multiple content including a plurality of the contents, wherein the instructions, when executed by a computer, cause the computer to perform the digital content editing method.

According to still another aspect of the present invention, provided is a recording medium on which a digital content editing computer program that makes a computer perform the digital content editing method is recorded.

BRIEF DESCRIPTION OF THE DRAWINGS

FIG. 2 is an explanatory diagram that depicts a multiple content distribution image;

FIG. 3A is an explanatory diagram that depicts a description model of constraint operation;

FIG. 3B is an explanatory diagram that depicts a description model of complementary constraint;

FIG. 3C is an explanatory diagram that depicts a description model of exclusive constraint;

FIG. 5B is a schematic diagram that depicts an example where content data of a multiple content in which the constraint exists is described in an MPEG21 format;

FIG. 6A is a schematic diagram that depicts an example in which license data is described in an XML format;

FIG. 6B is a schematic diagram that depicts an example in which license data is described in the XML format;

FIG. 6C is a schematic diagram that depicts an example in which license data is described in the XML format;

FIG. 6D is a schematic diagram that depicts an example in which license data is described in the XML format;

FIG. 7 is an explanatory diagram that depicts an example of a constraint relationship dictionary;

FIG. 8 is an explanatory diagram that depicts an example of an operation table;

FIG. 11 is an explanatory diagram that depicts an example of command statement data;

FIG. 18 is a flowchart that depicts the outline of a condition table merging process in the digital content editing apparatus according to the first embodiment;

FIG. 19A is a flowchart that depicts a condition table merging process in the digital content editing apparatus according to the first embodiment;

DETAILED DESCRIPTIONS

Preferred embodiments of a digital content editing apparatus, a digital content editing method, and a digital content editing computer program according to the invention are explained in detail below with reference to the appended drawings.

At the time of rendering an original content and reusing a material content selected by the user for reuse from material contents included in the rendered content, a digital content editing apparatus according to a first embodiment obtains a constraint described in license information of the original content and reuses a digital content so as to satisfy the obtained constraint.

Figure 1:
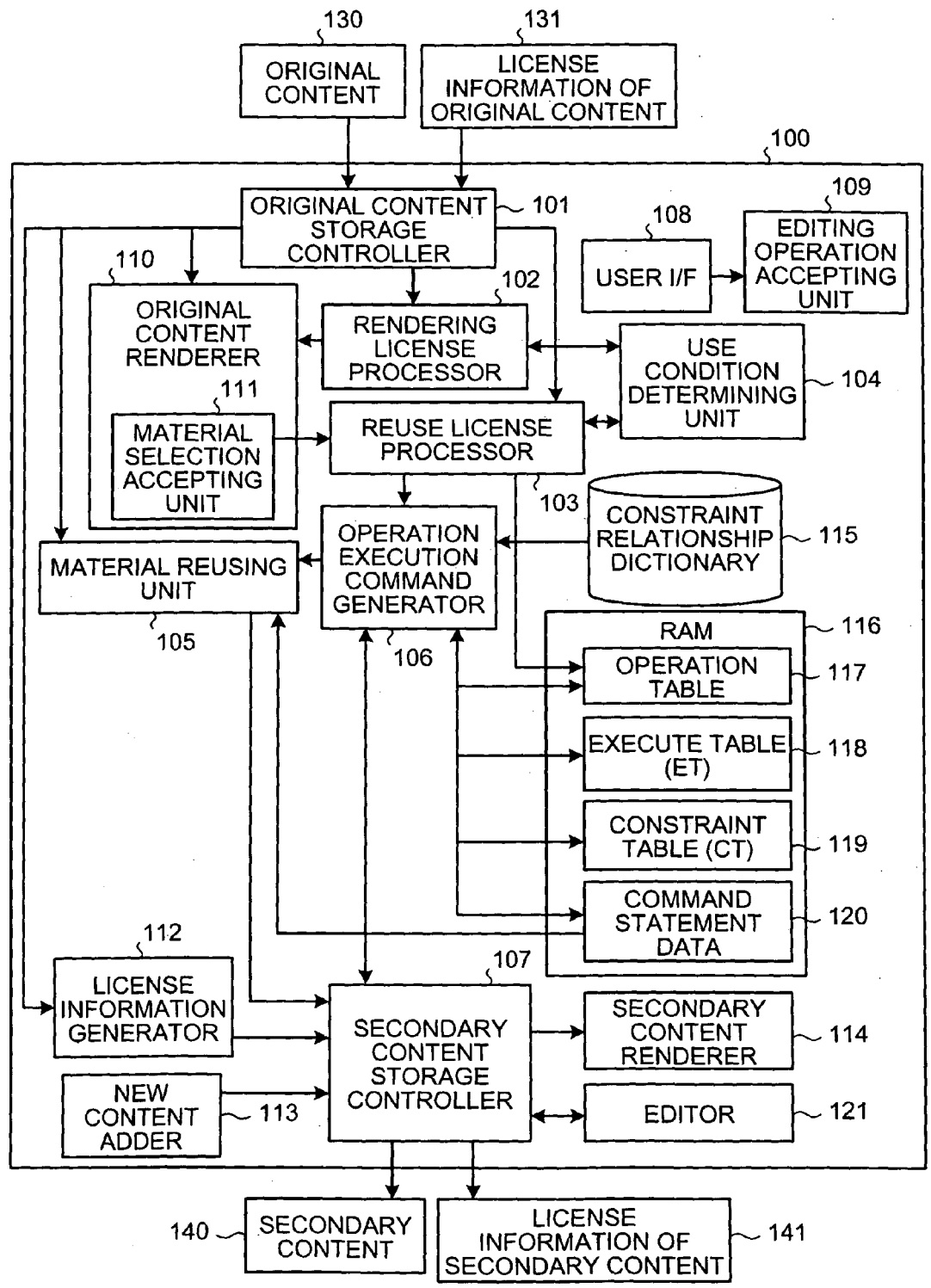
FIG. 1 is a block diagram that depicts a configuration of a digital content editing apparatus according to a first embodiment.

FIG. 1 is a block diagram that depicts a configuration of a digital content editing apparatus 100 according to the first embodiment. As shown in FIG. 1, the digital content editing apparatus 100 includes an original content storage controller 101, a rendering license processor 102, a reuse license processor 103, a use condition determining unit 104, a material reusing unit 105, an operation execution command generator 106, a secondary content storage controller 107, a user interface (I/F) 108, an editing operation accepting unit 109, an original content renderer 110, a material selection accepting unit 111, a license information generator 112, a new content adder 113, a secondary content renderer 114, and an editor 121. The digital content editing apparatus 100 according to the first embodiment stores a constraint relationship dictionary 115 in a hard disk drive (HDD). An operation table 117, an execute table (ET) 118, a constraint table (CT) 119, and command statement data 120 are stored in a Random Access Memory (RAM) 116.

An original content denotes a content to be reused. A single content or a multiple content constructed by a plurality of contents can be an original content. A material content is a content selected from contents constructing the original content as a material for reuse. A new content is a content newly created without being based on an existing content. A secondary content is a content generated based on an original content. A content obtained by adding a new content as necessary to a single material content or a plurality of material contents can be a secondary content.

In the digital content editing apparatus 100 according to the first embodiment, the original content storage controller 101 that reads an original content 130 and license information 131 of the original content, the rendering license processor 102 that processes the license information at the time of rendering the original content 130, the reuse license processor 103 that obtains a use condition and a constraint from the license information 131 of the original content 130 that is designated to be reused to generate an operation execution command and to reuse the content according to the conditions, the use condition determining unit 104, the material reusing unit 105, the operation execution command generator 106, the secondary content storage controller 107, the editing operation accepting unit 109, the original content renderer 110, the material selection accepting unit 111, the license information generator 112, the new content adder 113, the secondary content renderer 114, and the editor 121 operate in liaison with each other. The details of the structure of the license information 131 of the original content are explained later.

The original content storage controller 101 reads the original content 130 instructed by the user from the user I/F 108 and the license information 131 of the original content and stores them into a storage such as the RAM 116 in the digital content editing apparatus 100.

The rendering license processor 102 obtains the grant regarding rendering included in the license information 131 of the original content and performs a process of determining whether the original content 130 can be rendered or not in liaison with the use condition determining unit 104.

The reuse license processor 103 obtains the use condition and the constraint from the license information 131 of the original content corresponding to a content ID received from the material selection accepting unit 111, performs a process of determining whether the use condition for reuse is satisfied or not and a process of determining a constraint relation, and generates the operation table 117. The content ID denotes information for uniquely identifying the content. The details of the structure of the operation table 117 are explained later.

The use condition determining unit 104 determines the use condition described in the license information 131 of the original content and determines whether or not the content satisfies the use condition of rendering or reuse.

The operation execution command generator 106 receives the operation table 117 generated by the reuse license processor 103 and, with reference to the information of the content being reused obtained from the secondary content storage controller 107 and the relations among the constraints stored in the constraint relationship dictionary 115, generates an operation execution command satisfying the constraint stored in the received operation table 117.

The secondary content storage controller 107 stores a secondary content 140 being edited and license information 141 of the secondary content into a storage such as the RAM 116 and notifies the operation execution command generator 106 and the secondary content renderer 114 of the information of the secondary content 140 stored in the storage.

Based on the operation execution command generated by the operation execution command generator 106, the material reusing unit 105 reads a necessary content from the storage stored by the original content storage controller 101, and performs a process of reusing the read content.

The user I/F 108 includes a display device and an input device such as a keyboard and a mouse, displays a screen (not shown) for selection of a material content and a content reuse screen and accepts an input operation via the screens.

The editing operation accepting unit 109 accepts designation of generation of a new content and an editing operation by the user via the user I/F 108 and determines the type of the accepted editing operation.

The material selection accepting unit 111 accepts selection of a material content to be reused by the user from material contents included in the original content 130. The original content renderer 110 renders a material content accepted by the material selection accepting unit 111.

The license information generator 112 executes a process of editing the license information 141 of the edited secondary content. The new content adder 113 executes a process of adding a new content when the user designates addition of a new content. The secondary content renderer 114 renders the secondary content being edited. The editor 121 edits a new content or a secondary content to which a reused content is added.

The constraint relationship dictionary 115 is a data file storing the relations among constraints and defines, as a relation between constraints, a constraint contradictory to a certain constraint. The details of the structure of the constraint relationship dictionary 115 are explained later.

The RAM 116, which allows a random access, functions as a storage for storing the operation table 117, the ET 118, the CT 119, and the command statement data 120.

The operation table 117 stores an operation permitted at the time of reusing each of contents as components of a multiple content and a constraint type when a constraint exists. The details of the structure of the operation table 117 are explained later.

The ET 118 is a table used for storing a result of extraction of an execution condition of a content to be singly reused without any constraint from the operation table 117, a result of merging of the stored execution condition with data in the constraint table (CT) 119 and, further, an execution sequence generated from the merged condition. The details of the constraint and the structure of the ET 118 are explained later.

The CT 119 stores a result of extraction of a constraint from the operation table 117. The details of the constraint and the structure of the CT 119 are explained later.

The command statement data 120 is used to store a statement for executing a process of reusing a content, which is generated by converting an execution sequence stored in the ET 118. The details of the structure of the command statement data 120 are explained later.

FIG. 2 is a schematic diagram that depicts a state where each of components constructing a multiple content is singly distributed and reused as a content. In the example shown in FIG. 2, a content A is disassembled to contents A1 to A4 as components of the content A. Another content B1 is added to the contents A1 to A3, thereby generating a content B. The contents A2, A3, B1 as components of the content B and the content A4 as a component of the content A are reused and combined to another content C1, thereby forming a content C.

In the example of the digital content editing apparatus 100 according to the first embodiment shown in FIG. 2, when context information such as positioning of a component in the whole content A and a relation of the component with another component are defined for the contents A1 to A4, which are components of the content A, the context information can be protected at the reuse of the contents B and C.

FIG. 3A shows a definition of a constraint in the form of the XML schema format. In the first embodiment, a constraint 311 is defined in the form conforming to REL of MPEG 21 in an extended form of REL of MPEG 21. Specifically, as shown in FIG. 3A, as an extension of the "Right" (licensing operation) element in REL of MPEG 21, a licensing operation "adaptWithConstraint" is defined so as to designate one or both of a complementary constraint 312 and an exclusive constraint 313. The licensing operation is extended so that the licensing operation in REL of MPEG 21 includes a constraint corresponds to a constraint in the invention.

The complementary relation and the exclusive relation in general are not bidirectional and hence unidirectional constraints. In order to designate a bidirectional constraint, a constraint, i.e., the complementary condition or the exclusive constraint, has to be defined for each of two directions.

Although a constraint is expressed in the XML format in the first embodiment, it may be also expressed in a table format, a relational database format, a semantic network format, or the like.

FIG. 3B shows a definition of the complementary constraint 312 in FIG. 3A in the XML schema format. The complementary constraint is a constraint, which forces a simultaneous inclusion of a certain content at the time of the reuse of a main content under the complementary constraint. The complementary constraint 321 is expressed by a set of a constraint object content 322 and a constraint type. Here, the constraint object content denotes a content which inclusion or exclusion is forced under the constraint. As the constraint type, either a spatial constraint type 323 or a structural constraint type 324 is designated.

In the spatial constraint type 323, any of (1) above (to dispose the main content above the constraint object content), (2) below (to dispose the main content below the constraint object content), (3) rightside (to dispose the main content on the right side of the constraint object content), (4) leftSide (to dispose the main content on the left side of the constraint object content), (5) backward (to dispose the main content backward of the constraint object content), (6) forward (to dispose the main content forward of the constraint object content), (7) anywhere (to dispose the main content anywhere), and (8) predefined stylesheet (dispose the main content based on data describing a disposing method) can be designated.

In the structural constraint type 324, either (1) isContained (the constraint object content is included as an element of the main content) or (2) isPartOf (the main content is included as an element of the constraint object content) can be designated.

The constraint type is not limited to the above-described constraint types and may be extended. Contrarily, definition of a specific constraint type may be disabled depending on a type of a content. For example, a spatial concept does not fit well with audio content. Hence, when contents having a constraint relation are audio contents, the setting of spatial constraint type may be disabled. In such a case a constraint type that can be set can be limited based on the type of a content such as Mime Type.

FIG. 3C shows a definition of the exclusive constraint 313 in FIG. 3A in the XML schema format. The exclusive constraint is a constraint of inhibiting the presence of a constraint object content at the time of reusing a main content. An exclusive constraint 331 is expressed by a set of a constraint object content 332 and a constraint type. As the constraint type, an exclusive constraint type 333 ("exclusive") can be designated.

Figure 4A:
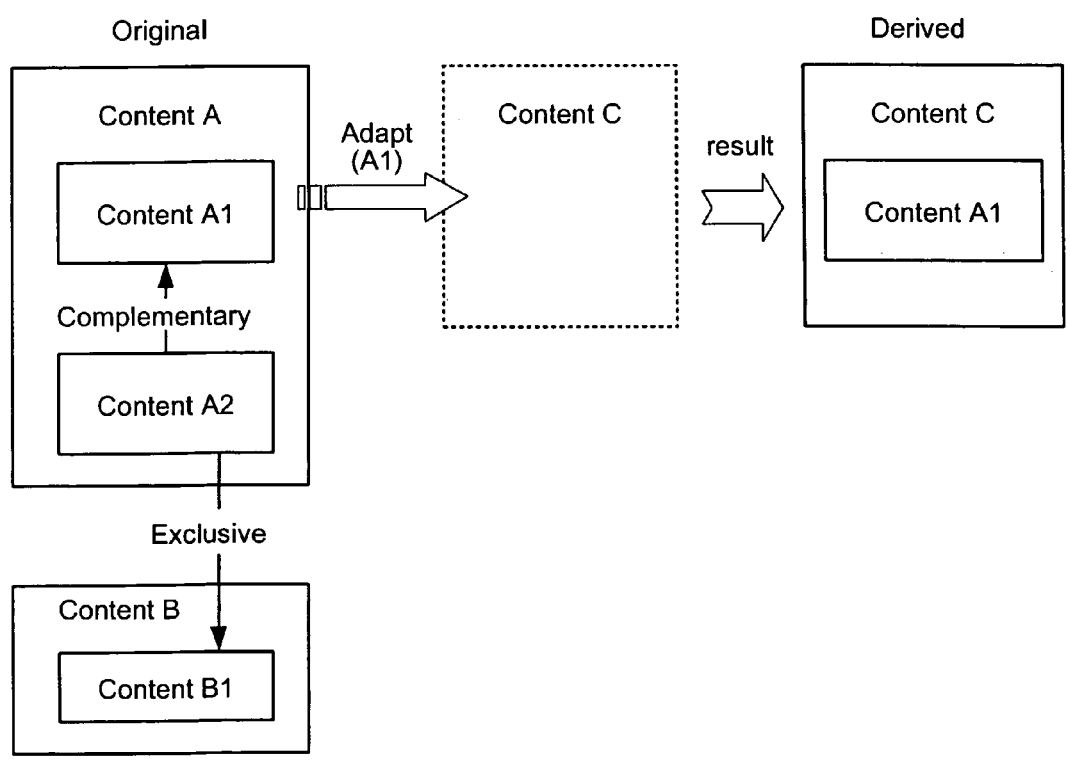
FIG. 4A is a schematic diagram that depicts an example of an image of re-using a multiple content in which the constraint exists.
Figure 4B:
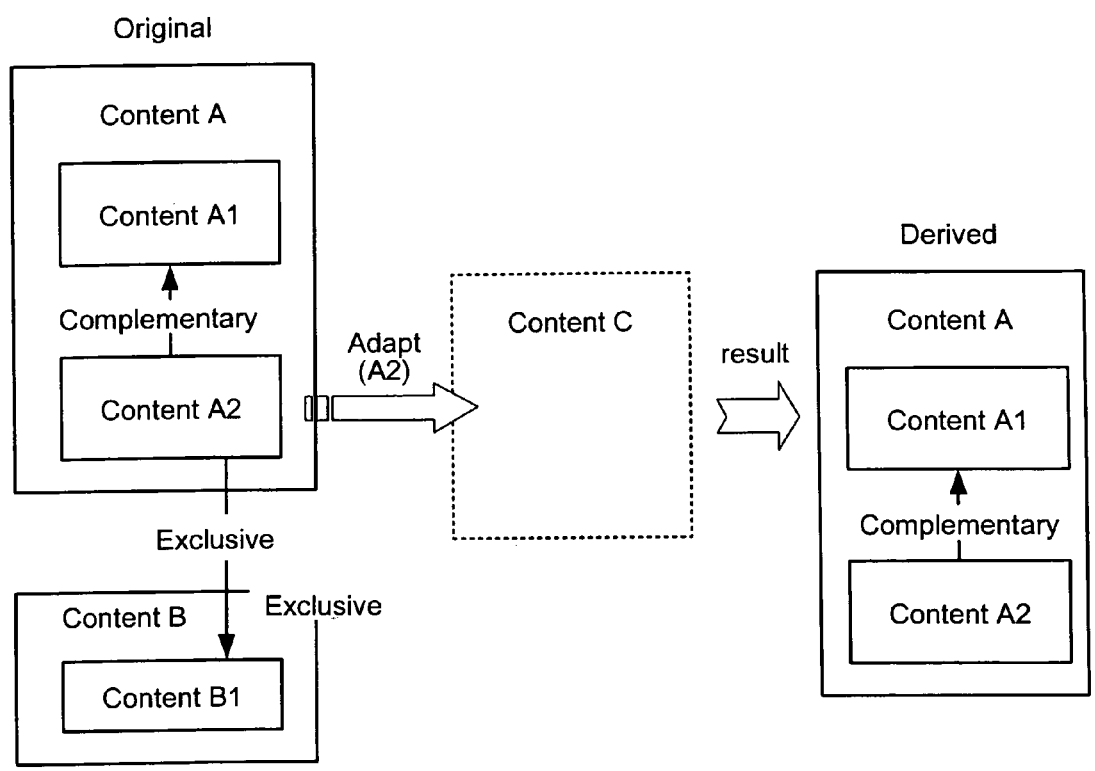
FIG. 4B is a schematic diagram that depicts an example of an image of re-using a multiple content in which the constraint exists.
Figure 4C:
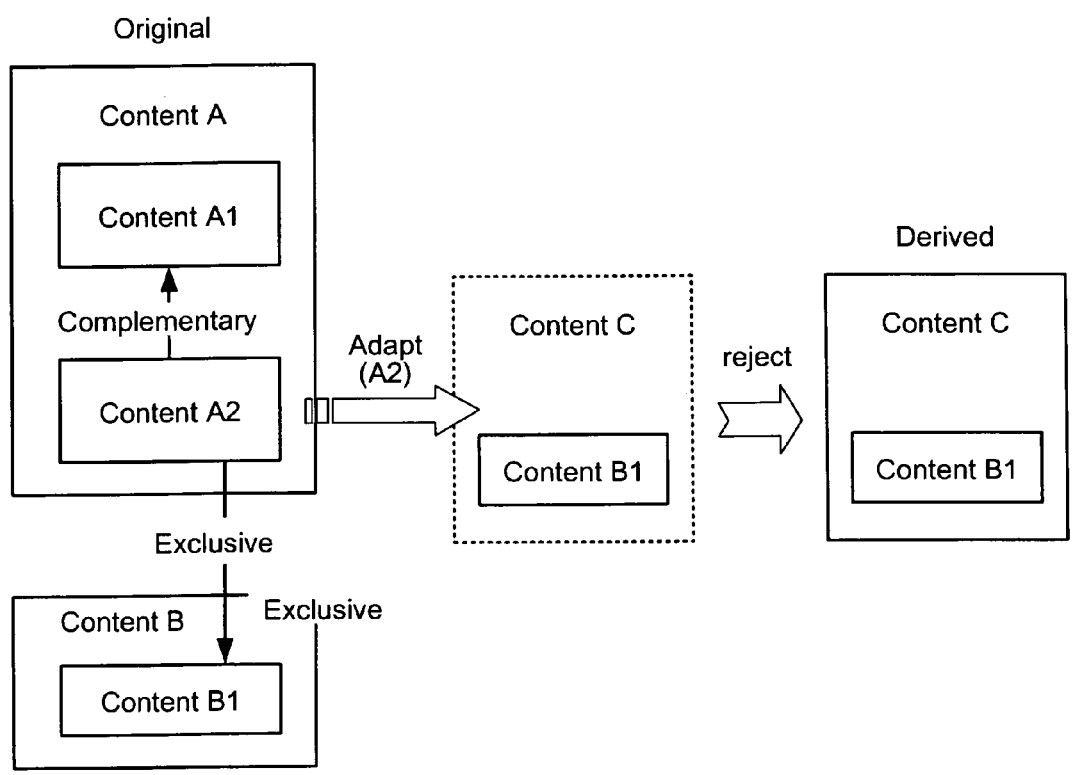
FIG. 4C is a schematic diagram that depicts an example of an image of re-using a multiple content in which the constraint exists.

FIGS. 4A to 4C are schematic diagrams that depict an example of the case of reusing components of a multiple content on which a constraint is designated in the digital content editing apparatus 100 according to the first embodiment. In FIGS. 4A to 4C, complementary constraint is defined from a content A2 to content A1 included in a content A, and the exclusive constraint is defined between the content A2 and a content B1 included in a content B.

FIG. 4A shows that when an instruction is given to reuse only the content A1 under the constraint, only the content A1 is reused as instructed. FIG. 4B shows that when an instruction is given to reuse only the content A2 under the constraint, the content A1 is forcedly fetched according to the complementary constraint and is reused simultaneously with the content A2. FIG. 4C shows that when an instruction is given to reuse the content A2 under the constraint in a situation that the content B1 is already reused, the reuse of the content A2 is rejected due to the exclusive constraint.

Figure 5A:
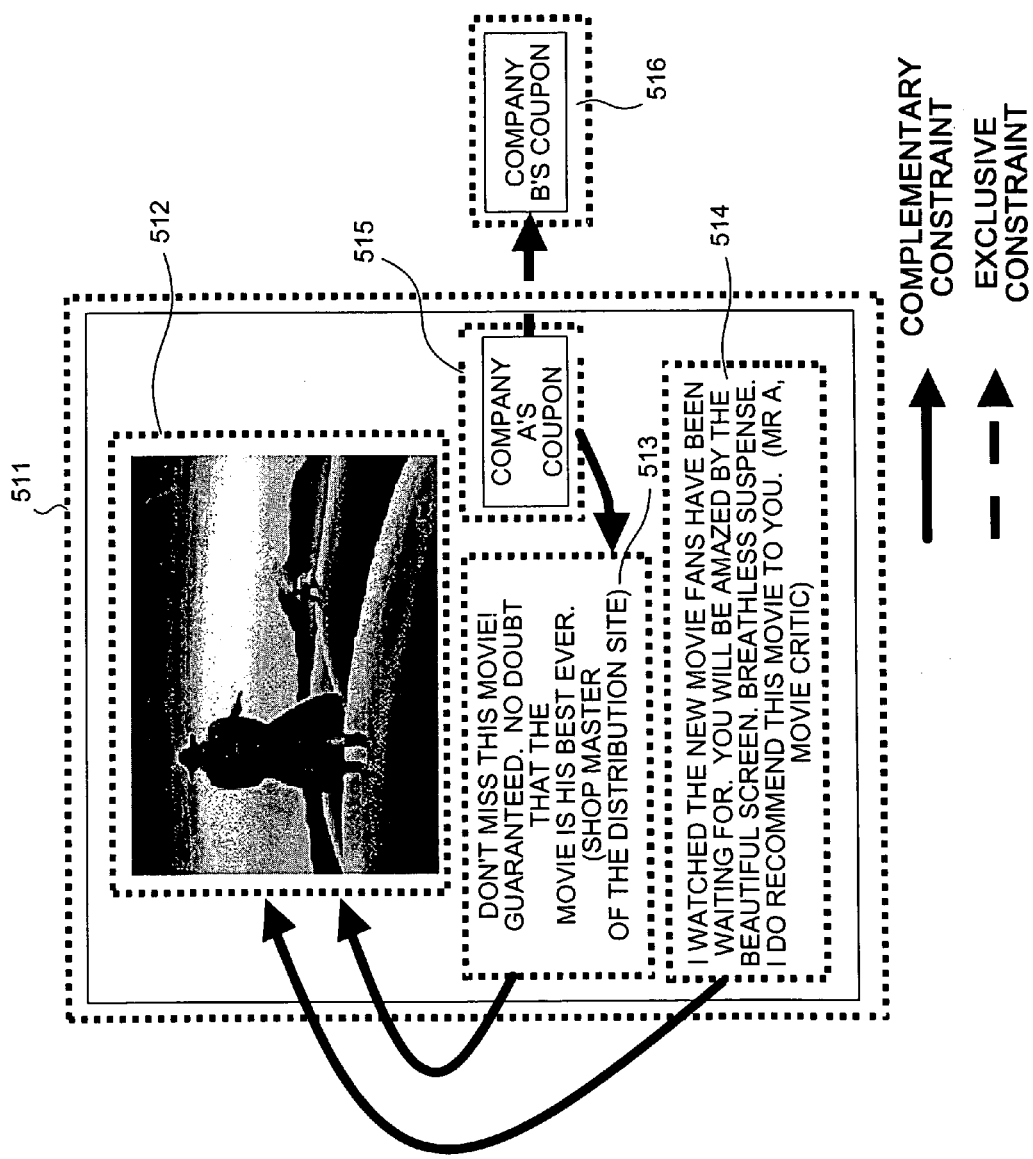
FIG. 5A is a schematic diagram that depicts an example of a constraint relation of a multiple content in which the constraint exists.

FIG. 5A is a schematic diagram that depicts an example of a multiple content on which the constraint is designated. A multiple content 511 includes, as material contents, a motion picture 512 for advertisement, commentaries 513 and 514 for the motion picture 512 for advertisement, and a company A's coupon 515. An exclusive constraint is designated between the company A's coupon 515 and a company B's coupon 516, and a complementary constraint is designated between the company A's coupon 515 and the commentary 513. A complementary constraint is designated between the commentaries 513 and 514 and the motion picture 512 for advertisement.

Specifically, the complementary constraint of displaying the company A's coupon 515 on the right side ("rightSide") of the commentary 513 is set, and the complementary constraint of displaying the commentaries 513 and 514 below ("below") the motion picture 512 for advertisement is set.

FIG. 5B shows an example where definition of data of the multiple content illustrated in FIG. 5A is described in the XML format determined by DIDL of MPEG 21. In a data description area 521, data of the motion picture 512 for advertisement is defined. In a data description area 522, data of the commentary 513 is defined. In a data description area 523, data of the company A's coupon 515 is defined. In a data description area 524, data of the commentary 514 is defined. In license information description areas 525 to 528, license information of the respective material contents is designated.

FIGS. 6A to 6D show an example in which a data structure of the license information 131 of the content in FIG. 1 is described in a format that is determined by REL of MPEG 21 in an extended format for describing the constraint. All of descriptions (611, 621, 631, and 641) of a grant are conformed to REL of MPEG 21 and elements of a use right holder (Principal), a licensing operation (Right), and a use condition (Condition) are defined.

The license information 611 in FIG. 6A shows a detailed description of the license information description area 525 illustrated in FIG. 5B. In the license information 611, a specific constraint is not described but a licensing operation 612 ("adapt") regarding a normal reuse is described.

The license information 621 in FIG. 6B shows a detailed description of the license information description area 526 illustrated in FIG. 5B. In the license information 621, a spatial constraint 622 ("below") between contents is described and this part is obtained by extending the REL of the current MPEG 21.

The license information 631 in FIG. 6C shows a detailed description of the license information description area 527 shown in FIG. 5B. In the license information 631, two constraints (632, 633) are described as constraints among contents. This part is obtained by extending the REL of the current MPEG 21. As the constraint 632, the spatial constraint ("rightSide")) is described as the complementary constraint. As the constraint 633, the exclusive constraint ("exclusive") is described.

The license information 641 in FIG. 6D indicates a detailed description of the license information description area 528 shown in FIG. 5B. In the license information 641, a spatial constraint 642 ("below") between contents is described. This part is obtained by extending the REL of the current MPEG 21.

FIG. 7 is an explanatory diagram that depicts an example of the structure of the constraint relationship dictionary 115. As shown in the example of FIG. 8, the constraint relationship dictionary 115 stores an operation opposite to a certain operation. For example, as an operation opposite to "above" indicative of an operation of disposing the main content above, "below" indicative of an operation of disposing the main content below is stored. The constraint relationship dictionary 115 is used to find out substantially the same constraint designated between two contents from the relations between constraints stored in the constraint relationship dictionary 115 and to eliminate the overlapped operations.

FIG. 8 is an explanatory diagram that depicts an example of the structure of the operation table 117. As shown in the example of FIG. 8, in the operation table 117, the grant (Right), a content ID (ID1) of a main content, a content ID (ID2) of a constraint object content, a constraint type (OpType), and a flag (ExistenceCheck) indicating whether the main content is reused or not are stored.

The licensing operation is to designate an operation permitted at the time of using a content. The data of a "Right" (licensing operation) element in REL of MPEG 21 is stored. In the digital content editing apparatus 100 according to the first embodiment, "adapt" specified in the standard of REL of MPEG21 or "adaptWithConstraint" specified by extending REL of MPEG21 is set as a licensing operation.

The content ID and the constraint type of a constraint object content are set only when "adaptWithConstraint" (licensing operation extended to have a constraint) is set as the licensing operation and otherwise "nil" is set As the constraint type, a value defined in correspondence with the kind of a constraint such as the spatial constraint or structural constraint is set.

The flag indicating whether the main content is reused or not is used for a process for preventing generation of an operation execution command of a content already reused. When a content is reused, "true" is set. When a content is not reused, "false" is set.

Figure 9:
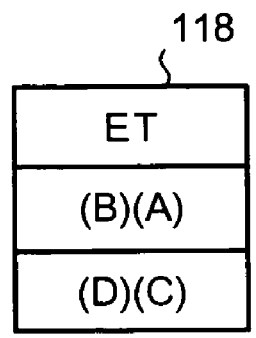
FIG. 9 is an explanatory diagram illustrating an example of an execute table (ET)

FIG. 9 is an explanatory diagram that depicts an example of the structure of the ET 118. In the ET 118, the IDs of contents to be reused are arranged in the order of the reuse from the left to store the order of execution of content reuse. For example, as shown in the diagram, when the content B is to be reused before the content A, data of "(B)(A)" is stored in the ET 118. When the content D is to be reused before the content C, data of "(D)(C)" is stored in the ET 118.

Figure 10:
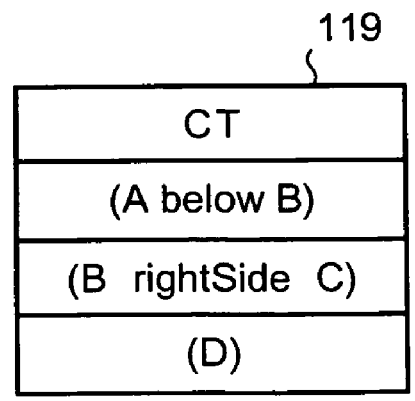
FIG. 10 is an explanatory diagram illustrating an example of a constraint table (CT)

FIG. 10 is an explanatory diagram that depicts an example of the structure of the CT 119. As shown in the example of the diagram, when a constraint is designated between two contents, data describing a constraint type between two content IDs is stored in the CT 119. When the constraint is not designated, data describing only the content ID is stored. For example, as shown in the diagram, when the content A is to be disposed below the content B at reuse, data "(A below B)" is stored in the CT 119. When the content B is to be disposed on the right side of the content C at reuse, data "(B rightSide C)" is stored in the CT 119. When a constraint is not designated for a content D, data "(D)" is stored in the CT 119.

FIG. 11 is an explanatory diagram that depicts an example of the structure of the command statement data 120. In the command statement data 120, reuse instructions are stored in order of reuse according to an execution sequence generated by merging the ET 118 and the CT 119. Specifically, as a statement, a sentence obtained by converting the content ID of a content is stored. With respect to an existing content, the content ID of the content is converted to "exist(content ID)". With respect to a content to be newly generated, the content ID of the content is converted to "new(content ID)". With respect to a content that has to be newly generated but preceded by a "new" instruction, the content ID of the content is converted to "tmp (content ID)". For example, when the execution sequence is "(PromotionVideo001)(comment001 below PromotionVideo001)", a statement to be stored in the command statement data 120 is "(new(PromotionVideo001)) (new(comment001) below tmp(PromotionVideo001))".

Figure 12:
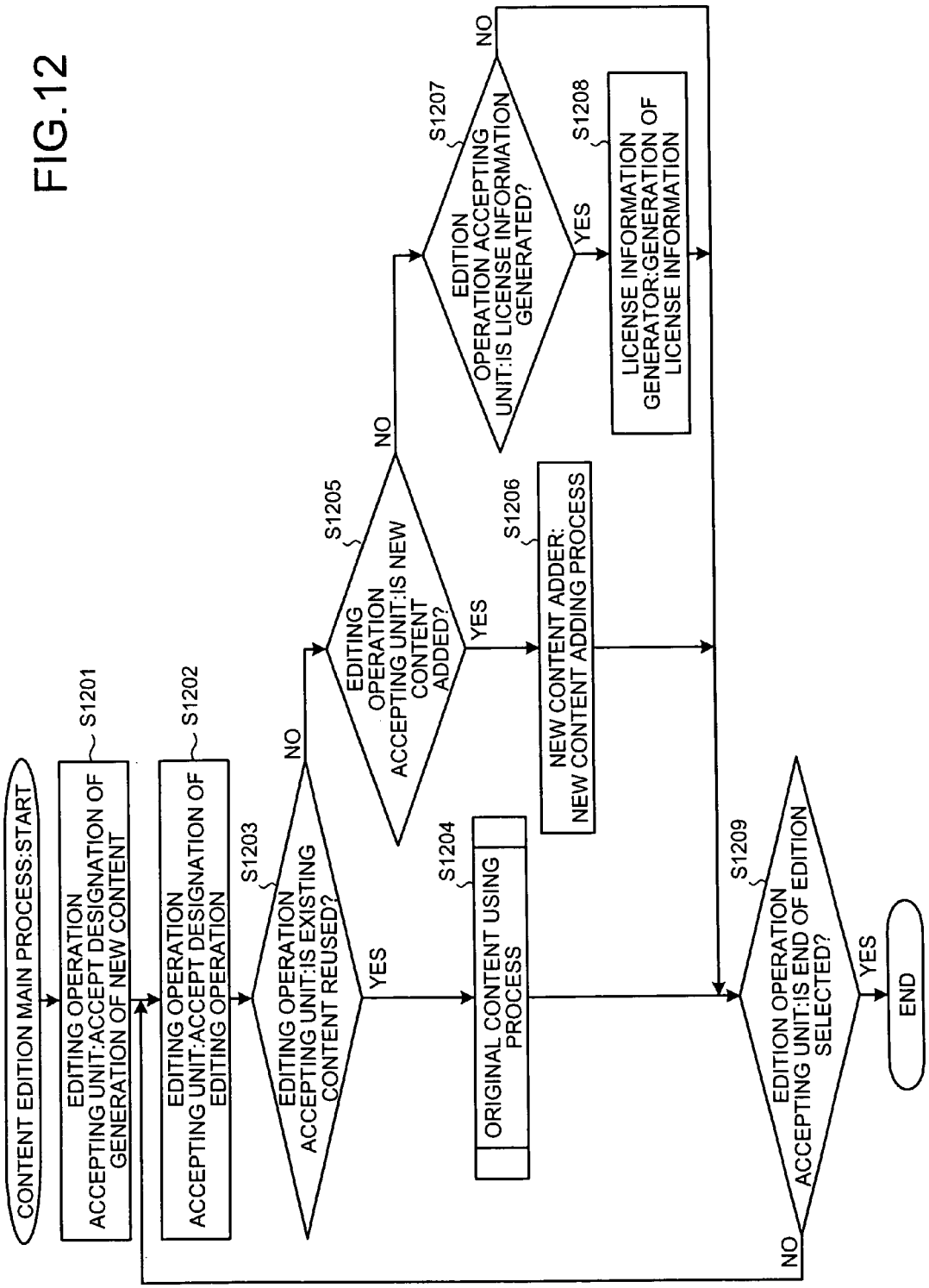
FIG. 12 is a flowchart that depicts a content editing process in the digital content editing apparatus according to the first embodiment.

Next, a content editing process by the digital content editing apparatus 100 of the first embodiment constructed as described above is explained. FIG. 12 is a flowchart that depicts the outline of a general flow of the contents editing process in the first embodiment.

First, the editing operation accepting unit 109 accepts designation of generation of a new content by the user (step S1201). The editing operation accepting unit 109 accepts designation of an editing operation (step S1202) and determines whether the accepted editing operation is reuse of an existing content or not (step S1203). When the accepted editing operation is reuse of an existing content (YES in step S1203), an original content using process is executed (step S1204). The details of the original content using process are explained later.

When the accepted editing operation is not reuse of an existing content (NO in step S1203), whether the accepted editing operation is addition of a new content or not is determined (step S1205). When the accepted editing operation is addition of a new content (YES in step S1205), a new content adding process is executed (step S1206). The new content adding process can be performed by a function realized by an existing drawing tool, a text editor, a motion picture editing tool or the like.

When the accepted editing operation is not addition of a new content (NO in step S1205), whether the accepted editing operation is generation of license information or not is determined (step S1207). When the accepted editing operation is generation of license information (YES in step S1207), a process of generating license information is executed (step S1208). The license information generating process can be realized by extending the function of editing the constraint based on the technique of USP Application Pub. No. US2003/0125976 or the like.

When the accepted editing operation is not generation of license information (NO in step S1207), whether end of edition is selected by the user or not is determined (step S1209). When the end of edition is selected (YES in step S1209), the content editing process is finished. When the end of edition is not selected (NO in step S1209), the editing operation accepting unit proceeds to a process of accepting designation of an editing operation (step S1202).

Figure 13:
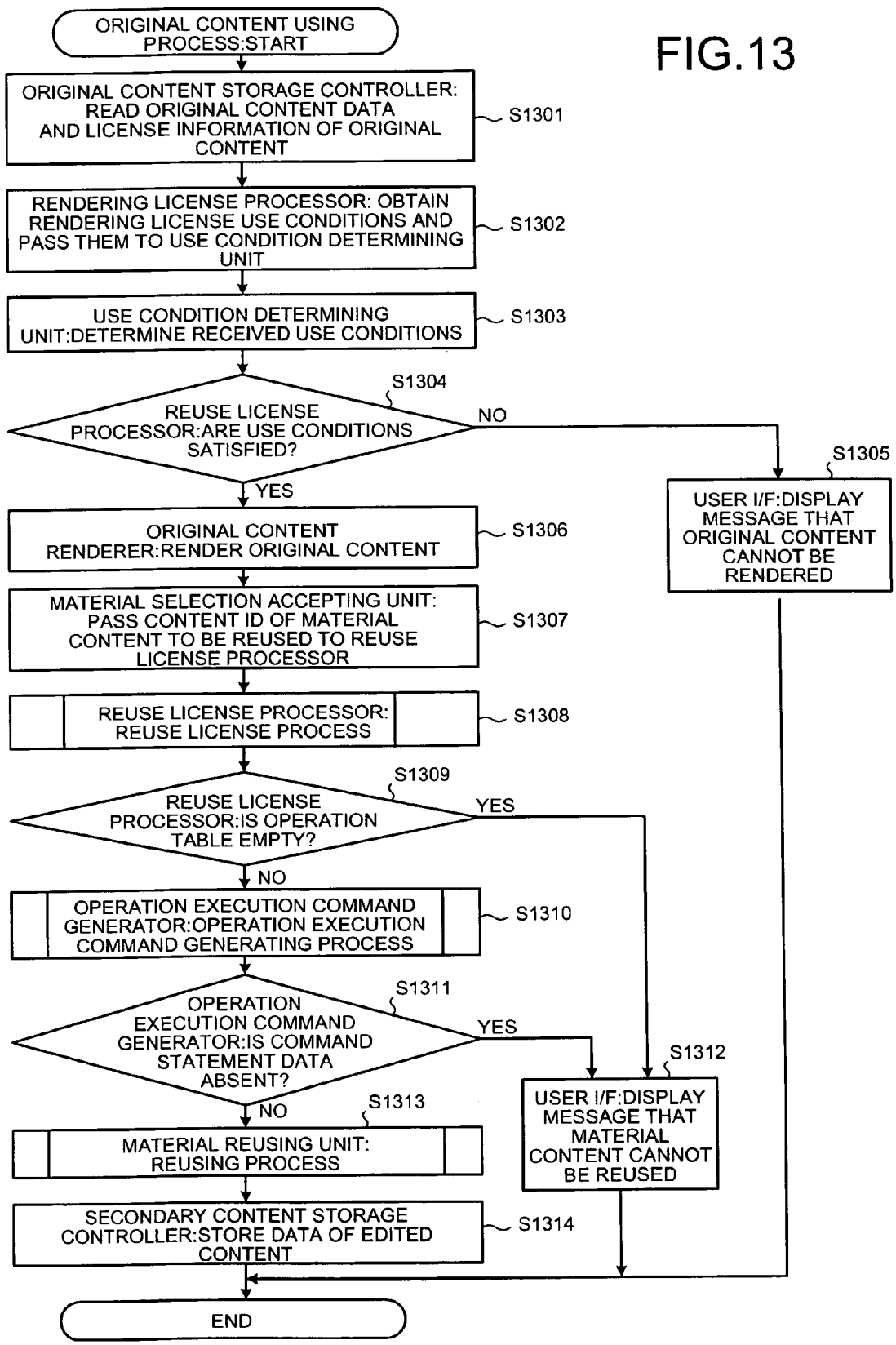
FIG. 13 is a flowchart that depicts an original content using process in the digital content editing apparatus according to the first embodiment.

FIG. 13 is a flowchart that depicts the general flow of an original content using process. First, the original content storage controller 101 reads content data of the original content 130 designated to be reused by the user and the license information 131 of the original content (step S1301). The original content 130 and the license information 131 may be integrated in the same file or may be in different files. The original content 130 that exists locally in a storage medium of an HDD or the like may be read or the original content 130 existing in an external server may be downloaded and read via a network.

The rendering license processor 102 obtains use conditions included in rendering license information in the license information and sends the obtained use conditions to the use condition determining unit 104 (step S1302). The use condition determining unit 104 determines based on the received use conditions whether the content satisfies the use conditions or not and returns the result of determination to the reuse license processor 103 (step S1303). In the use conditions, conditions such as the valid period, a charging method, price, valid area are described. The use conditions may be determined internally by using environment information in the digital content editing apparatus 100 or determined by using an external ASP or the like via a network. Further, an interactive process of presenting the use conditions and prompting the user to consent may be included.

The reuse license processor 103 determines whether the content satisfies the use conditions or not based on the determination result returned from the use condition determining unit 104 (step S1304). When the content does not satisfy the use conditions (NO in step S1304), a message that the original content cannot be rendered is displayed (step S1305) and the original content using process is finished. When the content satisfies the use conditions (YES in step S1304), the original content renderer 110 renders the original content 130 (step S1306).

When the original content 130 is rendered, the material selection accepting unit 111 accepts selection of a material content to be reused, that is designated by the user from the material contents included in the rendered original content 130 and sends the content ID of the accepted material content to the reuse license processor 103 (step S1307).

The reuse license processor 103 analyzes the license information 131 of the content corresponding to the received content ID, performs a process related to a license such as determination of use conditions for reuse and solution of a constraint, and generates the operation table 117 (step S1308). The details of the reuse license process are explained later.

The reuse license processor 103 determines whether the generated operation table 117 is empty or not (step S1309). When the operation table 117 is empty (YES in step S1309), the user I/F 108 displays a message that the material contents cannot be reused (step S1312). When the operation table 117 is not empty (NO in step S1309), the operation execution command generator 106 executes an operation execution command generating process of generating an operation execution command satisfying the constraint stored in the operation table 117 (step S1310). The details of the operation execution command generating process are explained later.

After the operation execution command is generated, the operation execution command generator 106 determines whether the command statement data 120 is absent or not (step S1311). When the command statement data 120 is absent (YES in step S1311), the user I/F 108 displays a message that the material content cannot be reused (step S1312). When the command statement data 120 is not absent (NO in step S1311), the material reusing unit 105 executes a reusing process of reusing a material content based on the generated operation execution command (step S1313). The details of the reusing process are explained later.

After the content is reused, the secondary content storage controller 107 stores the edited content data (step S1314) and finishes the original content using process.

Figure 14:
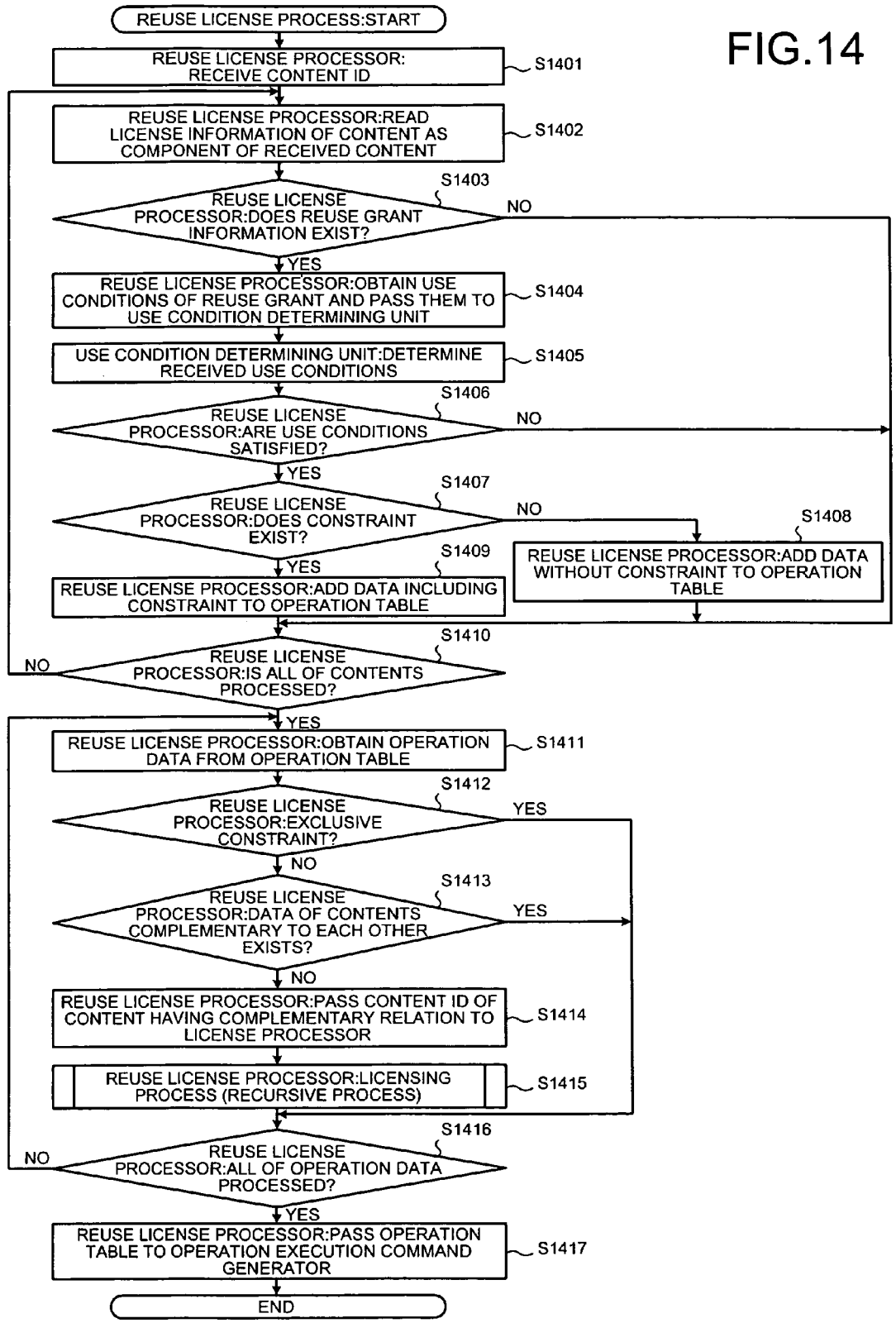
FIG. 14 is a flowchart that depicts a reuse licensing process in the digital content editing apparatus according to the first embodiment.

The details of the reuse license process in step S1308 in FIG. 13 are explained. FIG. 14 is a flowchart that depicts a general flow of the reuse license process. The reuse license process is recursively executed by liaison of the reuse license processor 103 and the use condition determining unit 104 (step S1415).

First, the reuse license processor 103 receives the content ID from the material selection accepting unit 111 (step S1401). Next, the processes from step S1402 to step S1410 are executed on all of the contents as components of the content corresponding to the received content ID.

The reuse license processor 103 reads the license information 131 of the content as a component (step S1402) and determines whether reuse grant information exists or not (step S1403). When the reuse license information does not exist (NO in step S1403), the reuse license processor 103 proceeds to a process of determining whether all of contents have been processed or not. When the reuse grant information exists (YES in step S1403), the use conditions included in the reuse grant information are obtained and passed to the use condition determining unit 104 (step S1404).

The use condition determining unit 104 determines based on the received use conditions whether the content satisfies the received use conditions or not and returns the result to the reuse license processor 103 (step S1405). As the use conditions, conditions such as the valid period, a charging method, price, valid area are described. The user conditions may be determined internally by using environment information in the digital content editing apparatus 100 or determined by using an external ASP or the like via a network. Further, an interactive process of presenting the use conditions and prompting the user to consent may be included.

The reuse license processor 103 determines whether the content satisfies the use conditions or not based on the determination result returned from the use condition determining unit 104 (step S1406). When the content does not satisfy the use conditions (NO in step S1406), the reuse license processor 103 moves to a process of determining whether all of contents have been processed or not. When the content satisfies the use conditions (YES in step S1406), the reuse license processor 103 moves to a process of determining whether a constraint exists or not (step S1407).

When no constraint exists (NO in step S1407), the reuse license processor 103 adds data indicative of absence of a constraint to the operation table 117 (step S1408). Specifically, data in which a license operation without a constraint ("adapt") is set as the licensing operation (Right), the content ID of a content that is presently processed is set as the content ID (ID1) of the main content, "nil" is set as the content ID (ID2) of the constraint object content and the constraint type (Op-Type), and "false" is set in "ExistenceCheck" is added to the operation table 117.

When a constraint exists (YES in step S1407), the reuse license processor 103 adds data including the constraint to the operation table 117 (step S1409). Specifically, data in which licensing operation ("adaptWithConstraint") extended so as to have a constraint is set as the licensing operation (Right), the content ID of the content that is presently processed is set as the content ID (ID1) of a main content, the content ID of a content as a target of the constraint is set as the content ID (ID2) of the constraint object content, the constraint type obtained from the license information 131 of the content is set as the constraint type (Op-Type), and "false" is set in "ExistenceCheck" is added to the operation table 117.

After adding the data to the operation table 117, the reuse license processor 103 determines whether all of contents have been processed or not (step S1410). When all of the contents have been processed (YES in step S1410), the reuse license processor proceeds to the following process. When all of the contents have not been processed (NO in step S1410), the reuse license processor 103 proceeds to a process of reading contents as the remaining components (step S1402).

The reuse license processor 103 executes the processes from step S1411 to step S1416 to detect a constraint relation from the license information 131 of the constraint content having a complementary relation and extract a content that has to be included simultaneously.

First, the reuse license processor 103 obtains operation data from the operation table 117 (step S1411) and determines whether the obtained operation data includes an exclusive constraint or not (step S1412). When an exclusive constraint is included (YES in step S1412), it is unnecessary to extract a content that has to be read simultaneously, so that the reuse license processor 103 moves to the following process.

When no exclusive constraint is included (NO in step S1412), whether the operation data of the contents having a mutually complementary relation exists in the operation table 117 or not is determined (step S1413). For example, whether operation data having the ID2 that is the same as ID1 of the operation data being presently processed and operation data having the same ID1 as ID2 exists or not is determined. When the applicable operation data exists (YES in step S1413), the reuse license processor 103 moves to the following process in order to avoid an endless loop of constraint relation extraction. When applicable operation data does not exist (NO in step S1413), to further detect a constraint relation, the content ID of the constraint object content having the complementary relation is passed to the reuse license processor 103 (step S1414) and the license process is recursively executed (step S1415).

Next, the reuse license processor 103 determines whether all of operation data has been processed or not (step S1416). When all of operation data has been processed (YES in step S1416), the reuse license processor 103 transfers the operation table 117 to the operation execution command generator 106 (step S1417) and finishes the license process. When all of operation data has not been processed (NO in step S1416), the reuse license processor 103 obtains the following operation data and repeats the process (step S1411).

Figure 15:
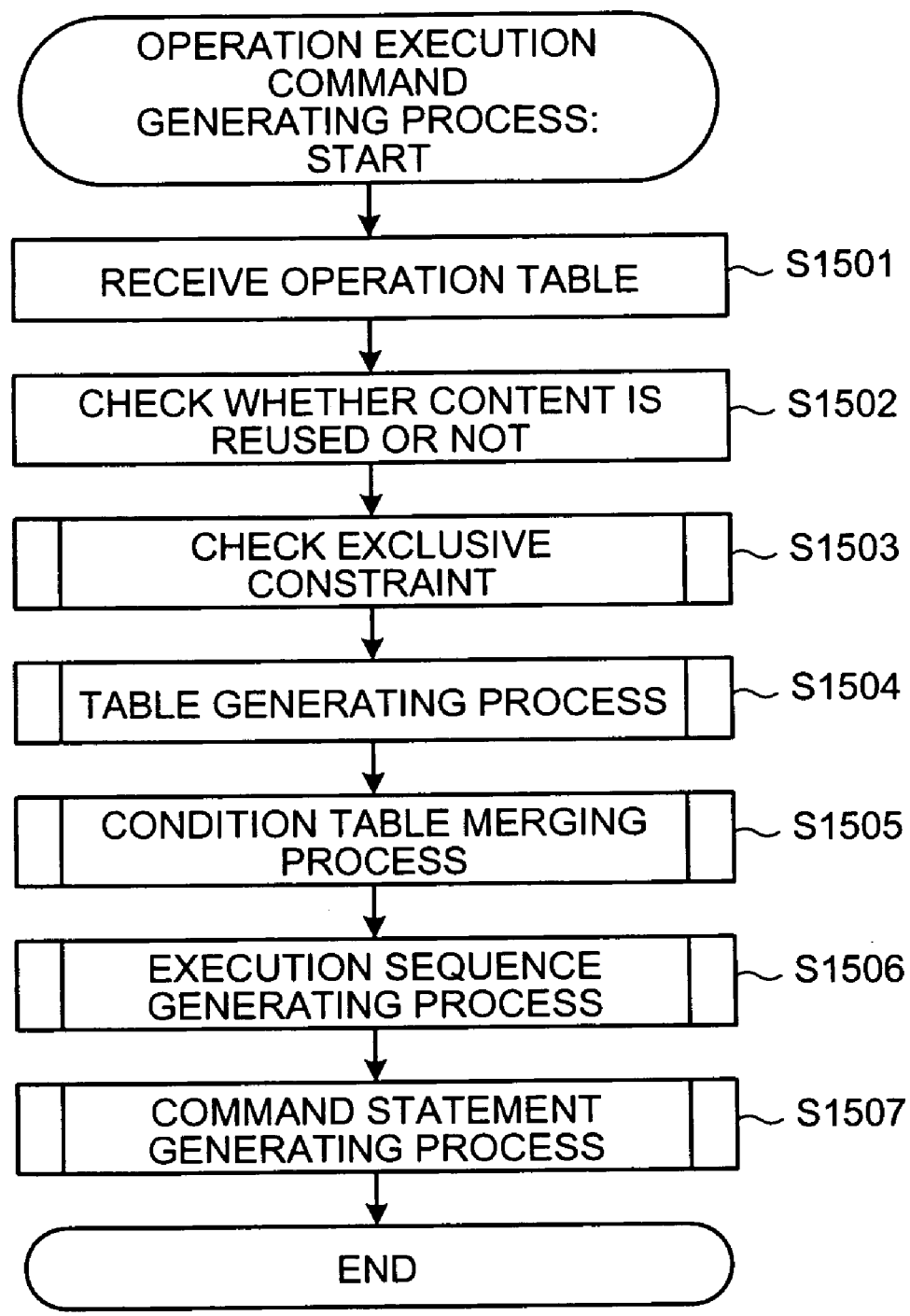
FIG. 15 is a flowchart that depicts an operation execution command generating process in the digital content editing apparatus according to the first embodiment.

FIG. 15 is a flowchart that depicts the outline of a general flow of the operation execution command generating process in step S1310 in FIG. 13.

First, the operation execution command generator 106 receives the operation table 117 generated by the reuse license processor 103 (step S1501). Next, the operation execution command generator 106 checks whether a content is reused or not with reference to information obtained from the received operation table 117 and the secondary content storage controller 107 (step S1502). Specifically, when the content ID (ID1) of the main content of the operation data in the operation table 117, which is the same as the content ID of the content being reused obtained from the secondary content storage controller 107 exists, "true" is set in "ExistenceCheck" of the operation data.

When the content ID that matches the content ID of the content being reused obtained from the secondary content storage controller 107 but does not match the content IDs in the operation data exists, operation data of the content corresponding to the content ID is newly added to the operation table 117. In this case, "true" is set in "ExistenceCheck". When the constraint object content having the exclusive relation is reused, the data is referred to in the process of disabling the reuse of the main content.

After that, the operation execution command generator 106 sequentially executes an exclusive constraint check (step S1503), a table generating process (step S1504), a condition table merging process (step S1505), an execution sequence generating process (step S1506), and a statement generating process (step S1507). The details of the processes are explained below.

Figure 16:
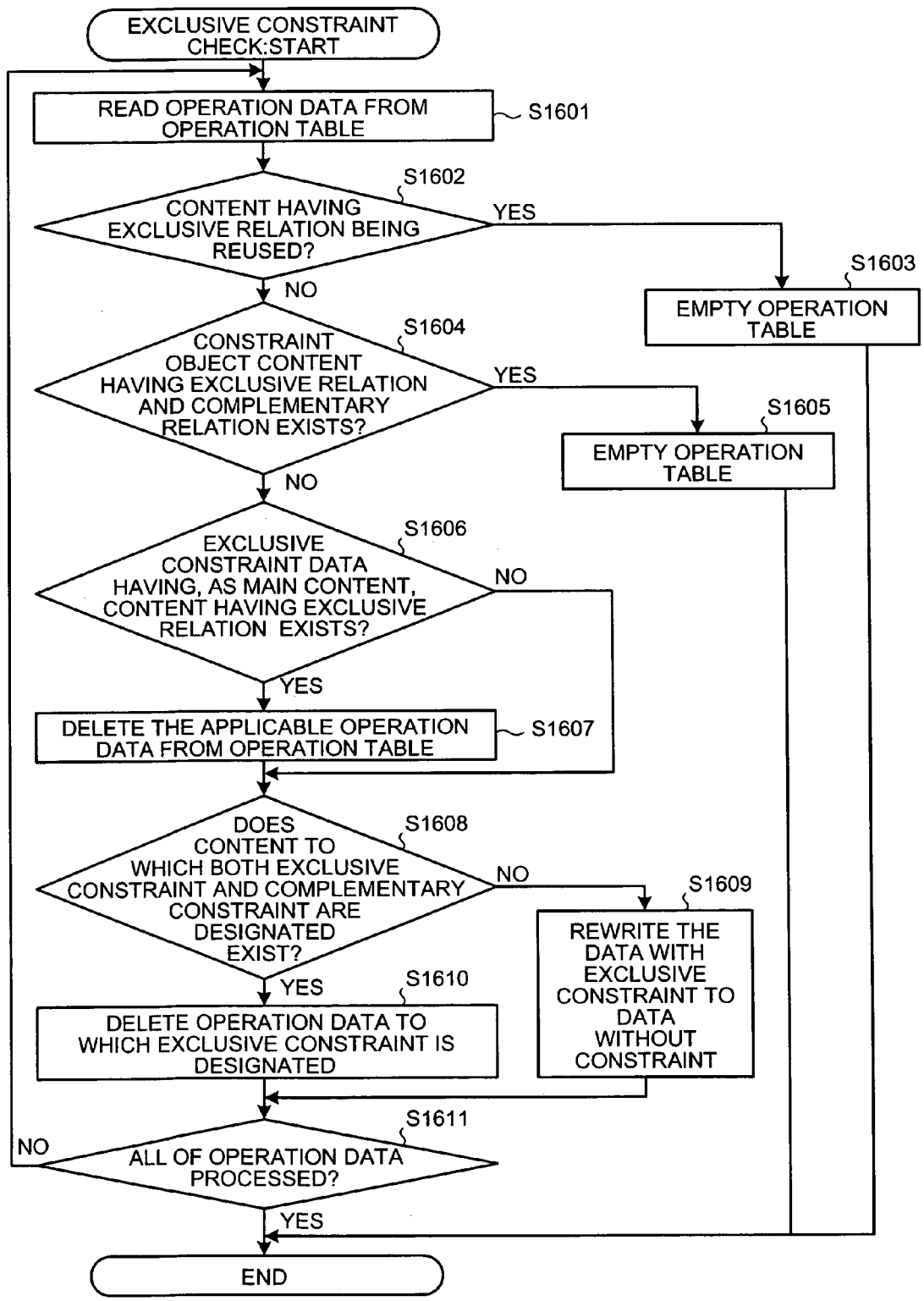
FIG. 16 is a flowchart that depicts an exclusive constraint checking process in the digital content editing apparatus according to the first embodiment.

FIG. 16 is a flowchart that depicts a general flow of the exclusive constraint checking process in step S1503 in FIG. 15.

First, the operation execution command generator 106 reads operation data from the operation table 117 (step S1601) and, when the read operation data is an exclusive constraint, determines whether a constraint object content having an exclusive relation is reused or not (step S1602). When the constraint object content is reused (YES in step S1602), the operation execution command generator 106 empties the operation table 117 (step S1603) to inhibit reuse of the main content instructed to be reused since the constraint object content having the exclusive relation is already reused.

When the constraint object content is not reused (NO in step S1602), whether the constraint object content to which both of the exclusive relation and the complementary relation are designated exists or not is determined (step S1604). When the content exists (YES in step S1604), the operation table 117 is emptied (step S1605). If the constraint object content exists, it means that the exclusive relation and the complementary relation are designated to the same constraint object content and it is contradictory, so that the operation table 117 is emptied in order to inhibit reuse of the main content.

Next, the operation execution command generator 106 determines whether operation data using the content ID of the constraint object content which has an exclusive relation but is not reused as the content ID (ID1) of the main content and in which an exclusive constraint is defined exists or not (step S1606). If such operation data exists (YES in step S1606), the operation execution command generator 106 deletes the operation data from the operation table 117 (step S1607) for the reason that the constraint object content not reused has the exclusive relation with the main content and does not have to be reused.

The operation execution command generator 106 determines whether a content to which both of the exclusive constraint and the complementary constraint are designated exists or not (step S1608). If such a content exists (YES in step S1608), the operation execution command generator 106 deletes operation data to which the exclusive constraint is designated (step S1610). If there is operation data to which a complementary constraint is designated, an operation execution command for reusing the main content can be generated in an operation execution command generating process explained later. Consequently, it is unnecessary to leave operation data to which an exclusive constraint is designated and a check of the exclusive relation has been completed.

When a content to which both the exclusive constraint and the complementary constraint are designated does not exist (NO in step S1608), the operation data in which an exclusive constraint is designated is rewritten to operation data without a constraint (step S1609). Specifically, data is rewritten to data in which a licensing operation without a constraint ("adapt") is set as the licensing operation (Right), the content ID of the content is set as the content ID (ID1) of the main content, "nil" is set as the content ID (ID2) of the constraint object content and the constraint type (Op-Type), and "false" is set in "ExistenceCheck" for the reason that, based on the result of checking the exclusive relation, it is determined that the content can be reused in a manner similar to a content without a constraint.

The operation execution command generator 106 determines whether all of operation data has been processed or not (step S1611). When all of operation data has not been processed (NO in step S1611), the operation execution command generator 106 obtains the following operation data and repeats the process (step S1601). When all of operation data has been processed (YES in step S1611), the exclusive constraint checking process is finished.

Figure 17:
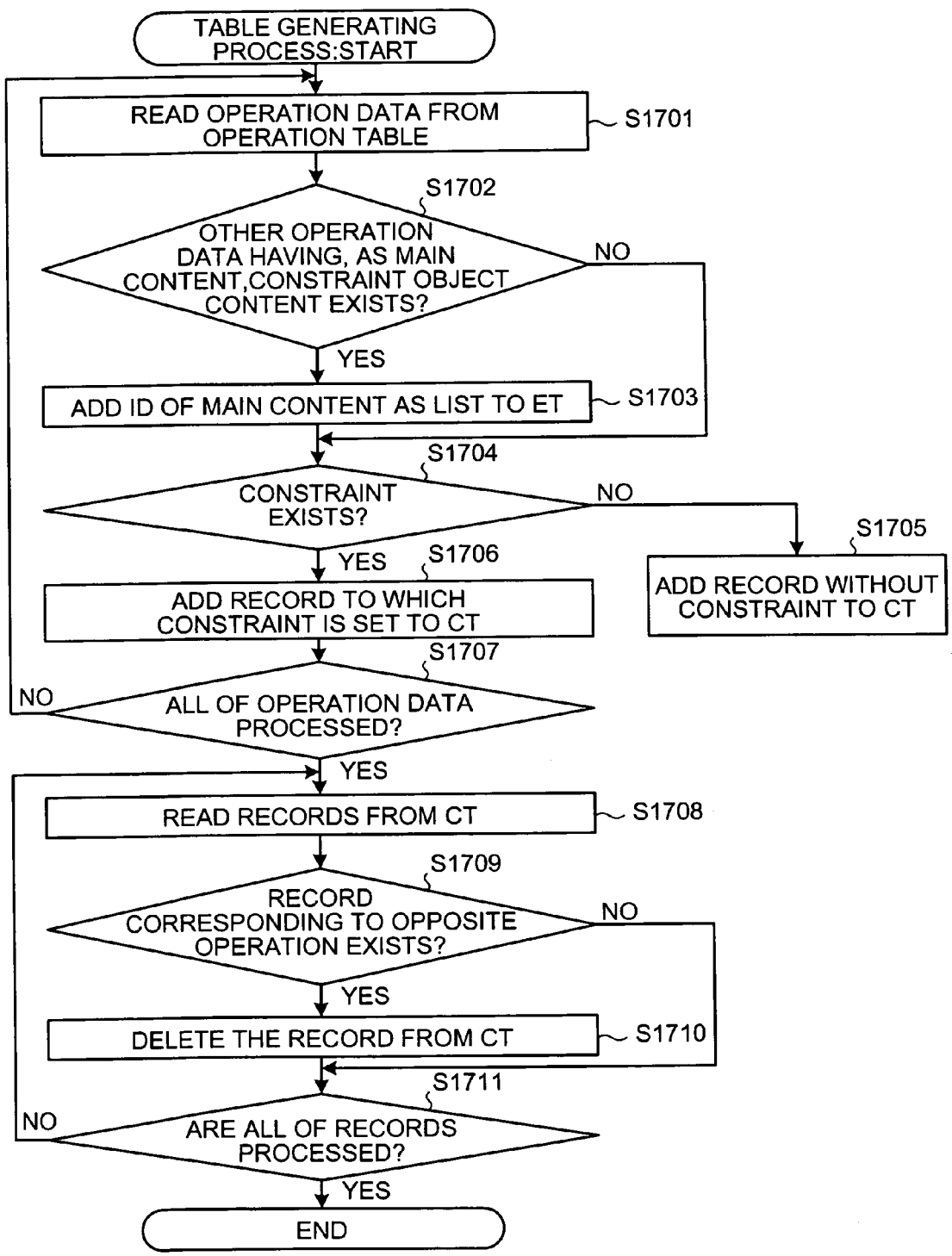
FIG. 17 is a flowchart that depicts a table generating process in the digital content editing apparatus according to the first embodiment.

FIG. 17 is a flowchart that depicts a general flow of the table generating process in step S1504 in FIG. 15.

First, the operation execution command generator 106 reads operation data from the operation table 117 (step S1701) and determines whether another operation data in which the main content of the read operation data is designated as a constraint object content exists or not (step S1702).

When the operation data exists (YES in step S1702), the content ID of the main content is added to the ET 118 (step S1703). When the applicable operation data does not exist (NO in step S1702), whether the read operation data includes a constraint or not is determined (step S1704).

When the read operation data is with a constraint (YES in step S1704), a record defining the constraint is added to the CT 119 (step S1706). Specifically, for example, when the read operation data designates a constraint of reuse so that the content A as a main content satisfies a constraint type Op with respect to the content B as a constraint object content, a list "(A Op B)" is added to the CT 119. As "Op", as described above, a constraint type such as (1) above, (2) below, (3) rightSide, (4) leftSide, (5) backward, (6) forward, or (7) anywhere is set.

When the read operation data is without a constraint (NO in step S1704), a record without a constraint is added to the CT 119 (step S1705). Specifically, when the read operation data is operation data of singly reusing the content A without a constraint, the list "(A)" is added to the CT 119.

Next, the operation execution command generator 106 determines whether all of operation data has been processed or not (step S1707). When all of operation data has not been processed (NO in step S1707), the operation execution command generator 106 obtains the next operation data and repeats the process (step S1701). When all of operation data has been processed (YES in step S1707), the operation execution command generator 106 shifts to the following process.

In steps S1708 to S1711, the operation execution command generator 106 performs a process of extracting and deleting records showing substantially the same conditions from records in the generated CT 119.

First, the operation execution command generator 106 reads records from the CT 119 (step S1708) and determines whether a record corresponding to an operation opposite to the operation of the read record exists or not (step S1709). Specifically, for example, when the read record is "(A above B)", the operation execution command generator 106 obtains the operation "below", which is opposite to the operation "above", from the constraint relationship dictionary 115 and determines whether a record "(B below A)" generated by interchanging the content IDs of the obtained opposite operation exists in the CT 119 or not.

When a record corresponding to the opposite operation exists (YES in step S1709), the applicable record is deleted from the CT 119 (step 1710). When a record corresponding to the opposite operation does not exist (NO in step S1709), whether all of records have been processed or not is determined (step S1711). When all of the records have not been processed (NO in step S1711), the following record is read and the process is repeated (step S1708). When all of records are processed (YES in step S1711), the table generating process is finished.

FIG. 18 is a flowchart that depicts the outline of a general flow of the condition table merging process in step S1505 in FIG. 15.

First, the operation execution command generator 106 merges a list in the CT 119 and a list in the ET 118 that have the same top element (step S1801).

The top element denotes here a content ID described at the left of a list and, when only one content ID is designated, the top element denotes the content ID. For example, "A" is the head element in the list "(A below B)" and "C" is the head element in the list "(C)".

Next, the operation execution command generator 106 moves a list including the constraint of a content that has to be rendered after rendering of a certain content to the back of the list of the content to be rendered first (step S1802). Further, the operation execution command generator 106 moves the list including the constraint of the content that has to be rendered before rendering of a certain content to the front of the list of the content to be rendered later (step S1803). After that, the operation execution command generator 106 adds all the remaining records in the CT 119 as new records of the ET 118 (step S1804). Finally, the operation execution command generator 106 performs a process of inserting a list in which a condition of a rendering the content that has to be rendered before a certain content to the front of the list of the content to be rendered later (step S1805). The details of the processes in steps S1801 to S1803 and step S1805 are explained later.

Figure 19B:
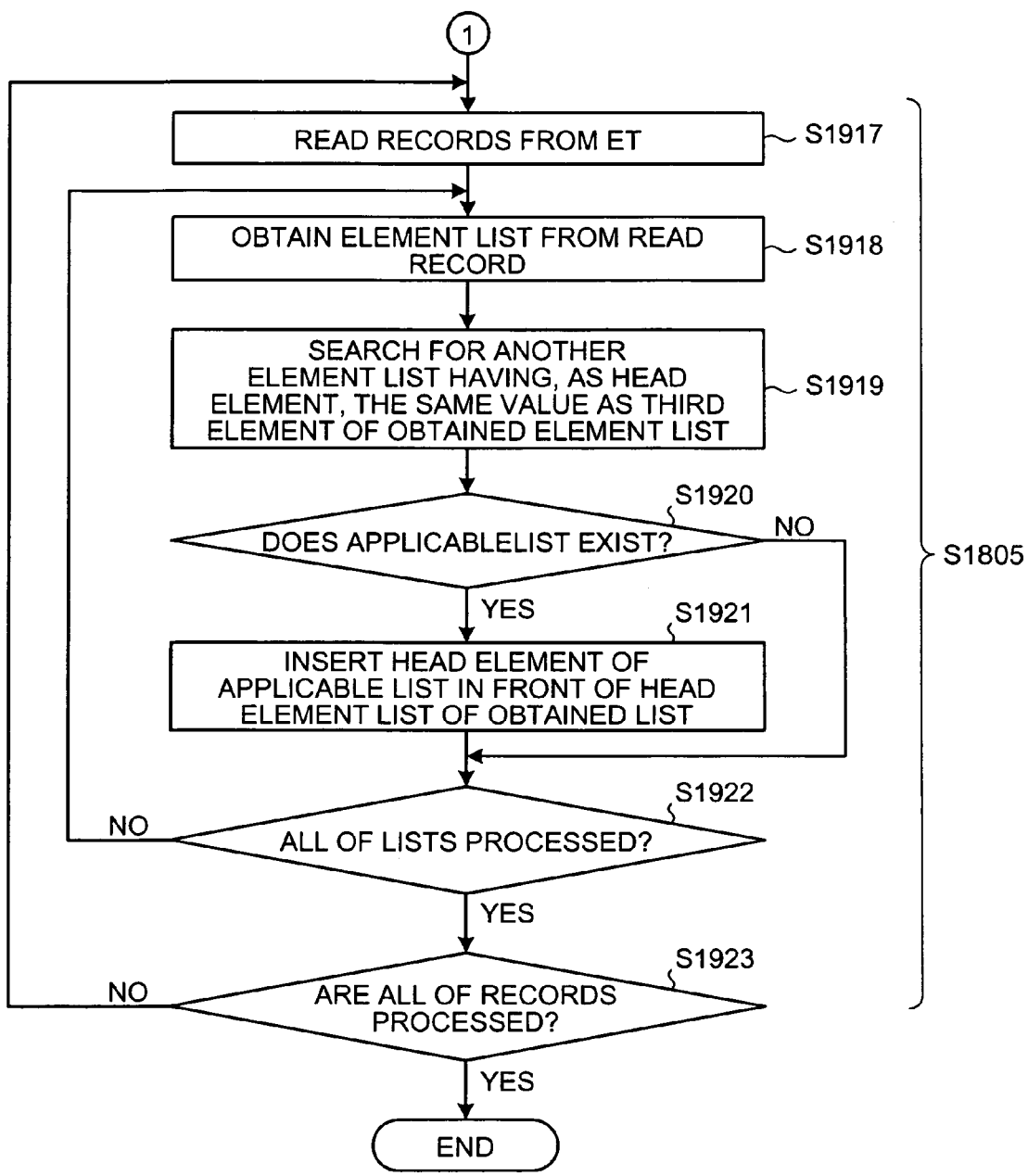
FIG. 19B is a flowchart that depicts the condition table merging process in the digital content editing apparatus according to the first embodiment.

FIGS. 19A and 19B are flowcharts that depict a general flow of the condition table merging process in step S1505 in FIG. 15. FIGS. 19A and 19B show the details of the processes in steps S1801 to S1803 and step S1805 whose outline has been described above with reference to FIG. 18.

Steps S1901 to S1905 show the detailed process of step S1801 in FIG. 18. First, the operation execution command generator 106 reads a record from the CT 119 (step S1901). Since one list is stored as one record in the CT 119, reading of one record denotes reading of one list. Next, all of lists in the ET 118 having, as the head element, the same value as the head element of the read list are retrieved (step S1902) and whether the applicable list exists or not is determined (step S1903).

When an applicable list does not exist (NO in step S1903), the operation execution command generator 106 moves to a process of determining whether all of records have been processed or not. When an applicable list exists (YES in step S1903), all of applicable lists are replaced with the read list and the read list is deleted from the CT 119 (step S1904).

For example, when the list "(A below B)" is stored in the CT 119 and the list "(B)(A)" is stored in the ET 118, the list "(B)(A)" in the ET 118 is replaced with the list "(B)(A below B)" and the list "(A below B)" is deleted from the CT 119.

Then the operation execution command generator 106 determines whether all of records have been processed or not (step S1905). When all of the records have not been processed (NO in step S1905), the operation execution command generator 106 obtains the following record and repeats the process (step S1901). When all of records have been processed (YES in step S1905), the operation execution command generator 106 moves to the following process.

Steps S1906 to S1910 show the detailed process of step S1802 in FIG. 18. First, the operation execution command generator 106 reads a record (list) from the CT119 (step S1906). Next, the operation execution command generator 106 retrieves all of lists in the ET 118 having, as the head element, the same value as a third element of the read list (step S1907) and determines whether an applicable list exists or not (step S1908).

The third element denotes the content ID of a constraint object content under the constraint. Specifically, the third element is a content ID "Y" in a list described in the form of "(X Op Y)" ("X" and "Y" denote content IDs and "Op" indicates the type of a constraint).

When an applicable list does not exist (NO in step S1908), the operation execution command generator 106 moves to a process of determining whether all of records have been processed or not. When an applicable list exists (YES in step S1908), the read list is added to the end of all of applicable lists and is deleted from the CT 119 (step S1909).

For example, when the list "(A below B)" is stored in the CT 119 and the list "(B)" is stored in the ET 118, the list "(A below B)" is added to the end of the list "(B)" of the ET 118, thereby generating a list "(B)(A below B)" and the list "(A below B)" is deleted from the CT 119.

Next, the operation execution command generator 106 determines whether all of records have been processed or not (step S1910), and when all of the records have not been processed (NO in step S1910), obtains the following record, and repeats the process (step S1906). When all of records have been processed (YES in step S1910), the operation execution command generator 106 moves to the following process.

The steps S1911 to S1915 show the detailed process of step S1803 in FIG. 18. First, the operation execution command generator 106 reads a record (list) from the CT119 (step S1911). Next, the operation execution command generator 106 retrieves all of lists in the ET 118 having the same value as the head element of the read list as the third element (step S1912) and determines whether an applicable list exists or not (step S1913).

When an applicable list does not exist (NO in step S1913), the operation execution command generator 106 moves to a process of determining whether all of records have been processed or not. When an applicable list exists (ES in step S1913), the read list is added at the front of all of the applicable lists and is deleted from the CT 119 (step S1914).

For example, when the list "(A below B)" is stored in the CT 119 and the list "(C below A)" is stored in the ET 118, the list "(A below B)" is added to the front of the list "(C below A)" in the ET 118, thereby generating a list "(A below B)(C below A)" and the list "(A below B)" is deleted from the CT 119.

Then the operation, execution command generator 106 determines whether all of records have been processed or not (step S1915), and when all of records have not been processed (NO in step S1915), obtains the following record and repeats the process (step S1911). When all of the records have been processed YES in step S1915), the operation execution command generator 106 shifts to the following process.

The following step S1916 is the same as step S1804 in FIG. 18 where a process of adding all the remaining records in the CT 119 as new records in the ET 118 is executed. Since a list designating a content without a constraint that is singly reused or a content existing only in the CT 119 is not merged to the ET 118 by the above-described process, by newly adding the list to the ET 118, it is prepared to the execution sequence generating process performed based on the ET 118. The details of the execution sequence generating process are explained later.

Steps S1917 to S1923 show the detailed process in step S1805 in FIG. 18. First, the operation execution command generator 106 reads a record from the ET 118 (step S1917) and obtains an element list from the read record (step S1918).

The element list denotes a parenthesized unit describing an individual constraint or the like. For example, when the record is "(C)(B below C)(A below B)", each of "(C)", "(B below C)", and "(A below B)" is an element list.

Further, the operation execution command generator 106 searches for another element list having, as the head element, the same value as the third element of the obtained element list (step S1919) and determines whether an applicable list exists or not (step S1920).

When no applicable list exists (NO in step S1920), the operation execution command generator 106 moves to a process of determining whether all of records have been processed or not. When an applicable list exists (YES in step S1920), the head element of the applicable list is inserted to a position immediately before the obtained element list (step S1921).

For example, when the list "(B below A)(A below C)" is stored in the ET 118, the head element "(A)" of the list "(A below C)" is inserted in the front of the list "(B below A)(A below C)", thereby generating the list "(A)(B below A)(A below C)".

Next, the operation execution command generator 106 determines whether all of lists have been processed or not (step S1922), when all of the lists have not been processed (NO in step S1922), obtains the next list in the record, and repeats the process (step S1918). When all of the lists have been processed (YES in step S1922), the operation execution command generator 106 moves to the following process.

The operation execution command generator 106 determines whether all of records have been processed or not (step S1923), and when all of the records have not been processed (NO in step S1923), obtains the following record and repeats the process (step S1917). When all of the records have been processed (YES in step S1923), the condition table merging process is finished.

Figure 20:
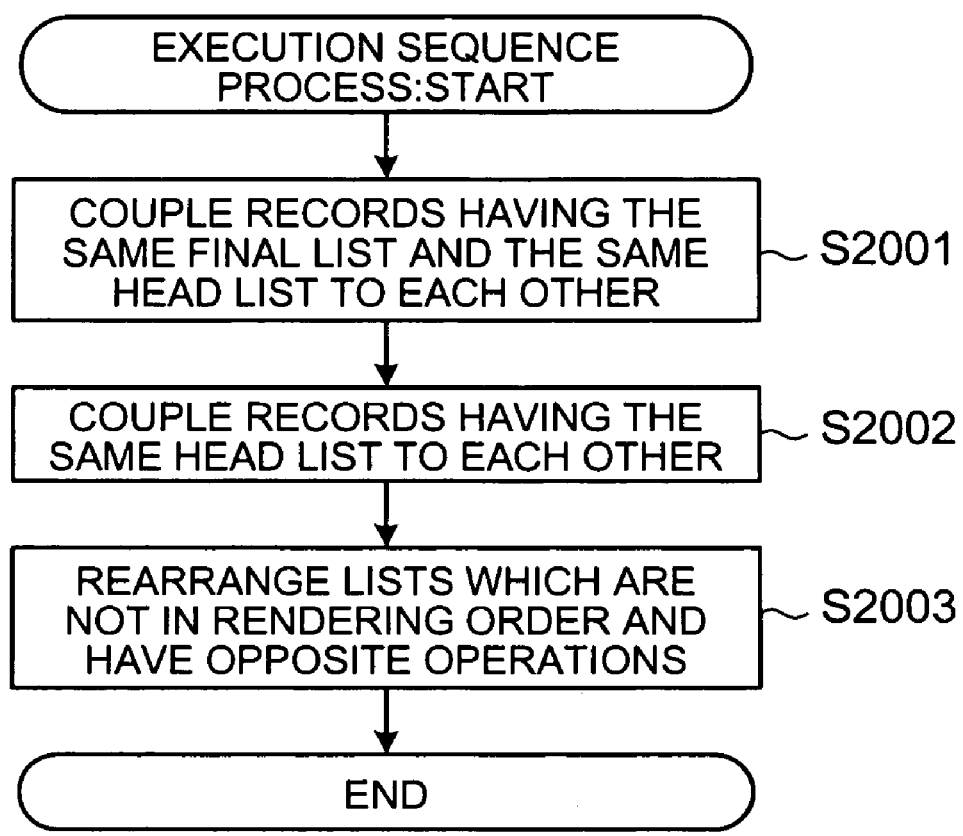
FIG. 20 is a flowchart that depicts the outline of an execution sequence generating process in the digital content editing apparatus according to the first embodiment.

FIG. 20 is a flowchart that depicts the outline of a general flow of the execution sequence generating process in step S1506 in FIG. 15.

First, the operation execution command generator 106 couples records having the same final list and the head list in the records in the ET 118 (step S2001).

The final list denotes the element list existing at the right end of the records, and the head list denotes the element list existing at the left end of the records. For example, when the record is "(C)(B below C)(A below B)", the list "(C)" is the head list and the list "(A below B)" is the final list.

Next, the operation execution command generator 106 couples records having the same head list (step S2002) and, finally, executes a process of rearranging lists which are not in order of rendering and have opposite operations (step S2003). The details of the processes in step S2001 to S2003 are explained later.

Figure 21:
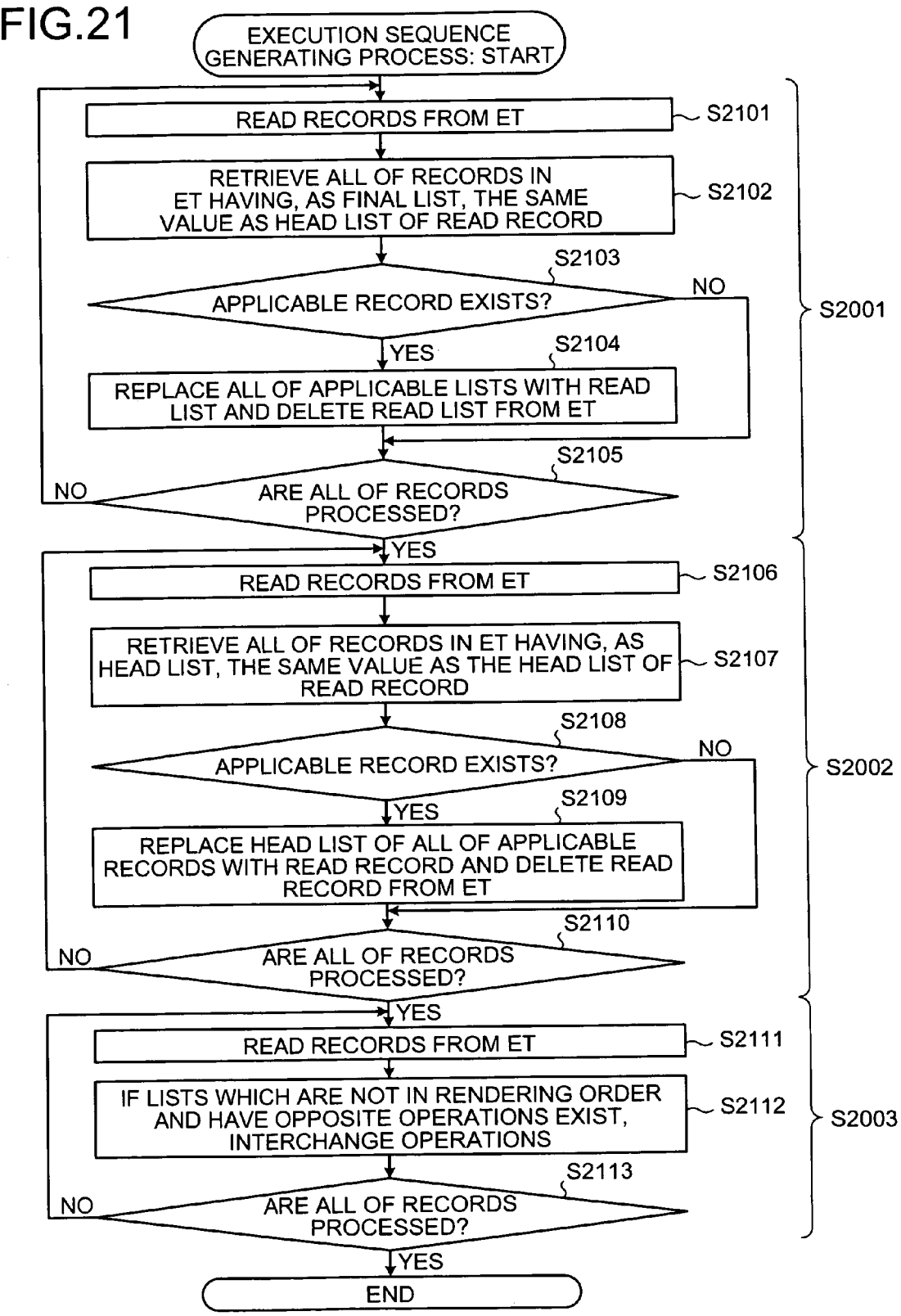
FIG. 21 is a flowchart that depicts an execution sequence generating process in the digital content editing apparatus according to the first embodiment.

FIG. 21 is a flowchart that depicts a general flow of the execution sequence generating process in step S1506 in FIG.

15 and depicts the details of the processes in steps S2001 to S2003 whose outline has been described above with reference to FIG. 20.

Steps S2101 to S2105 show the detailed process of step S2001 in FIG. 20. First, the operation execution command generator 106 reads records from the ET 118 (step S2101). Next, the operation execution command generator 106 retrieves all of records in the ET 118, having the same list as the head list of the read record as a final list (step S2102) and determines whether an applicable record exists or not (step S2103).

When an applicable record does not exist (NO in step S2103), the operation execution command generator 106 moves to a process of determining whether all of records have been processed or not. When an applicable record exists (ES in step S2103), the operation execution command generator 106 replaces the final list of all of applicable records with the read record and deletes the read record from the ET 118 (step S2104).

For example, the record "(C)(B below C)(A below B)" and the record "(D)(C)" are stored in the ET 118, the final list "(C)" in the record "(D)(C)" is replaced with the record "(C)(B below C)(A below B)", and the record "(C)(B below C)(A below B)" is deleted. As a result, only the record "(D)(C)(B below C)(A below B)" remains.

The operation execution command generator 106 determines whether all of records have been processed or not (step S2105), and when all of records have not been processed (NO in step S2105), obtains the following record, and repeats the process (step S2101). When all of records have been processed YES in step S2105), the operation execution command generator 106 shifts to the following process.

Steps S2106 to S2110 show the detailed process of step S2002 in FIG. 20. First, the operation execution command generator 106 reads a record from the ET 118 (step S2106). Next, the operation execution command generator 106 retrieves all of records in the ET 118 having, as the head list, the same list as the head list of the read record (step S2107) and determines whether an applicable record exists or not (step S2108).

When an applicable record does not exist (NO in step S2108), the operation execution command generator 106 shifts to the process of determining whether all of records have been processed or not. When an applicable list exists (ES in step S2108), the head list of all of applicable records is replaced with the read record and the read record is deleted from the ET 118 (step S2109).

For example, when the record "(B below C)(A below B)" and the record "(B below C)(C)" are stored in the ET 118, the head list "(B below C)" of the record "(B below C)(C)" is replaced with the record "(B below C)(A below B)", and the record "(B below C)(A below B)" is deleted. As a result, only the record "(B below C)(A below B)(C)" remains.

Next, the operation execution command generator 106 determines whether all of records have been processed or not (step S2110), and when all of records have not been processed (NO in step S2110), obtains the following record, and repeats the process (step S2106). When all of records have been processed (YES in step S2110), the operation execution command generator 106 shifts to the following process.

Steps S2111 to S2113 show the detailed process of step S2003 in FIG. 20. First, the operation execution command generator 106 reads a record from the ET 118 (step S2111). Next, the operation execution command generator 106 searches for lists that are not in rendering order and whose operations are opposite to each other in the read record and, if an applicable list exists, executes the process of interchanging the operations (step S2112).

Specifically, the operation execution command generator 106 searches for a list having the pattern of "(X aa Y )##(Y)" or "(X aa Y )##(Y bb X )". The operation execution command generator 106 obtains the operation "cc" opposite to "aa" from the constraint relationship dictionary 115 and executes a process of replacing "(X aa Y)" with "(X)" and replacing "Y" with "(Y cc X)". Each of "X" and "Y" denotes the content ID, each of "aa", "bb", and "cc" indicates a constraint type, "" indicates a character sequence, and "##" expresses an element list.

For example, in the case of the pattern "(X below Y)(Y)", "Y" is rendered and, after that, "X" has to be rendered below "Y" according to the spatial constraint of "below". However, rendering of "Y" is designated after that, so that it is necessary to rearrange the rendering order and convert the operation to the opposite operation.

For example, when the record "(B below C)(A below B)(C)" is stored in the ET 118, the list "(B below C)" is replaced with "(B)" and the list "(C)" is replaced with the list "(C above B)", so that the record as a whole is converted to the record "(B)(A below B)(C above B).

The operation execution command generator 106 determines whether all of records have been processed or not (step S2113), and when all of records have not been processed (NO in step S2113), obtains the following record, and repeats the process (step S2111). When all of records have been processed (YES in step S2113), the execution sequence generating process is finished.

Figure 22:
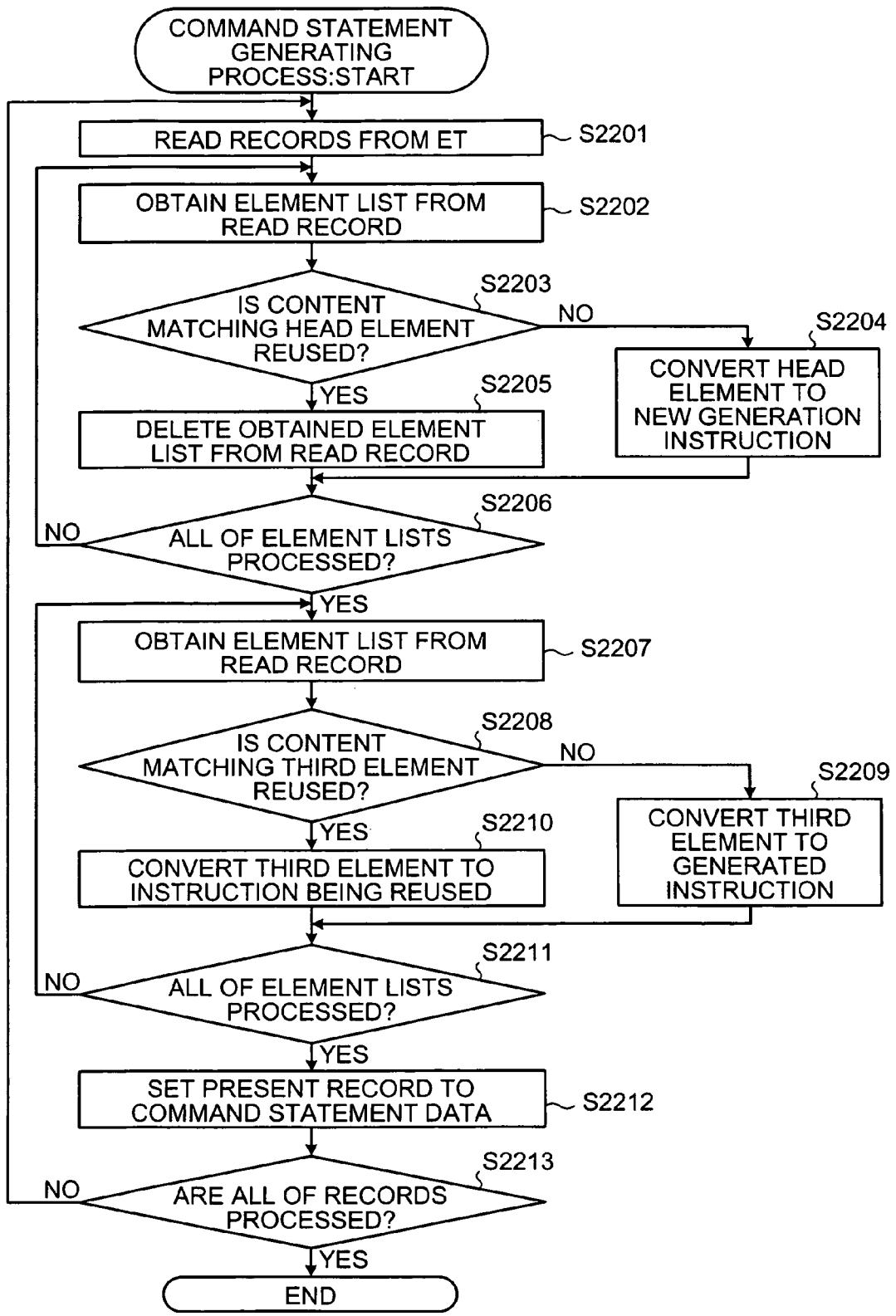
FIG. 22 is a flowchart that depicts a statement generating process in the digital content editing apparatus according to the first embodiment.

FIG. 22 is a flowchart that depicts a general flow of the statement generating process in step S1507 in FIG. 15.

First, the operation execution command generator 106 reads a record from the ET 118 (step S2201), obtains an element list from the read record (step S2202), determines whether a content matching the head element of the obtained element list is reused or not (step S2203) and, when the content is reused (YES in step S2203), deletes the obtained element list from the read record. Since the content is reused, it is unnecessary to newly generate a statement for reuse.

When the content is not reused (NO in step S2203), the operation execution command generator 106 converts the head element to a new generation instruction (step S2204). Specifically, the head element is converted to a statement by adding "new" in the front of the head element. For example, the head element "X" is converted to "new(X)".

Subsequently, the operation execution command generator 106 determines whether all of element lists have been processed or not (step S2206), and when all of the element lists have not been processed (NO in step S2206), obtains the following element list, and repeats the process (step S2202). When all of the element lists are processed (YES in step S2206), the operation execution command generator 106 shifts to the following process.

Next, the operation execution command generator 106 obtains the element list again, subjected to the converting process from the read record (step S2207) and determines whether a content matching the third element of the obtained element list is reused or not (step S2208). When the content is reused (YES in step S2208), the operation execution command generator 106 converts the third element of the obtained element list to an instruction being reused (step S2210), specifically, converts the third element to a statement by adding "exist" in the front of the third element of the obtained element list. For example, the third element "X" is converted to "exist(X)".

When the content is not reused (NO in step S2208), the operation execution command generator 106 converts the third element to a statement generated, specifically, converts the third element to a statement by adding "tmp" in the front of the third element. For example, when the third element is "X", the third element is converted to "tmp(X)". Since the content matching the third element is not reused, a content has to be newly generated. However, since a content is newly generated by the existing new generation instruction ("new"), it is prevented from generating overlapped new contents.

The operation execution command generator 106 determines whether all of element lists have been processed or not (step S2211), and when all of element lists have not been processed (NO in step S2211), obtains the following element list, and repeats the process (step S2207). When all of element lists have been processed (YES in step S2211), the present record is set as the command statement data 120 (step S2212).

The operation execution command generator 106 determines whether all of records have been processed or not (step S2213), and when all of records have not been processed (NO in step S2213), obtains the following record, and repeats the process (step S2201). When all of the records have been processed (YES in step S2213), the statement generating process is finished.

Figure 23:
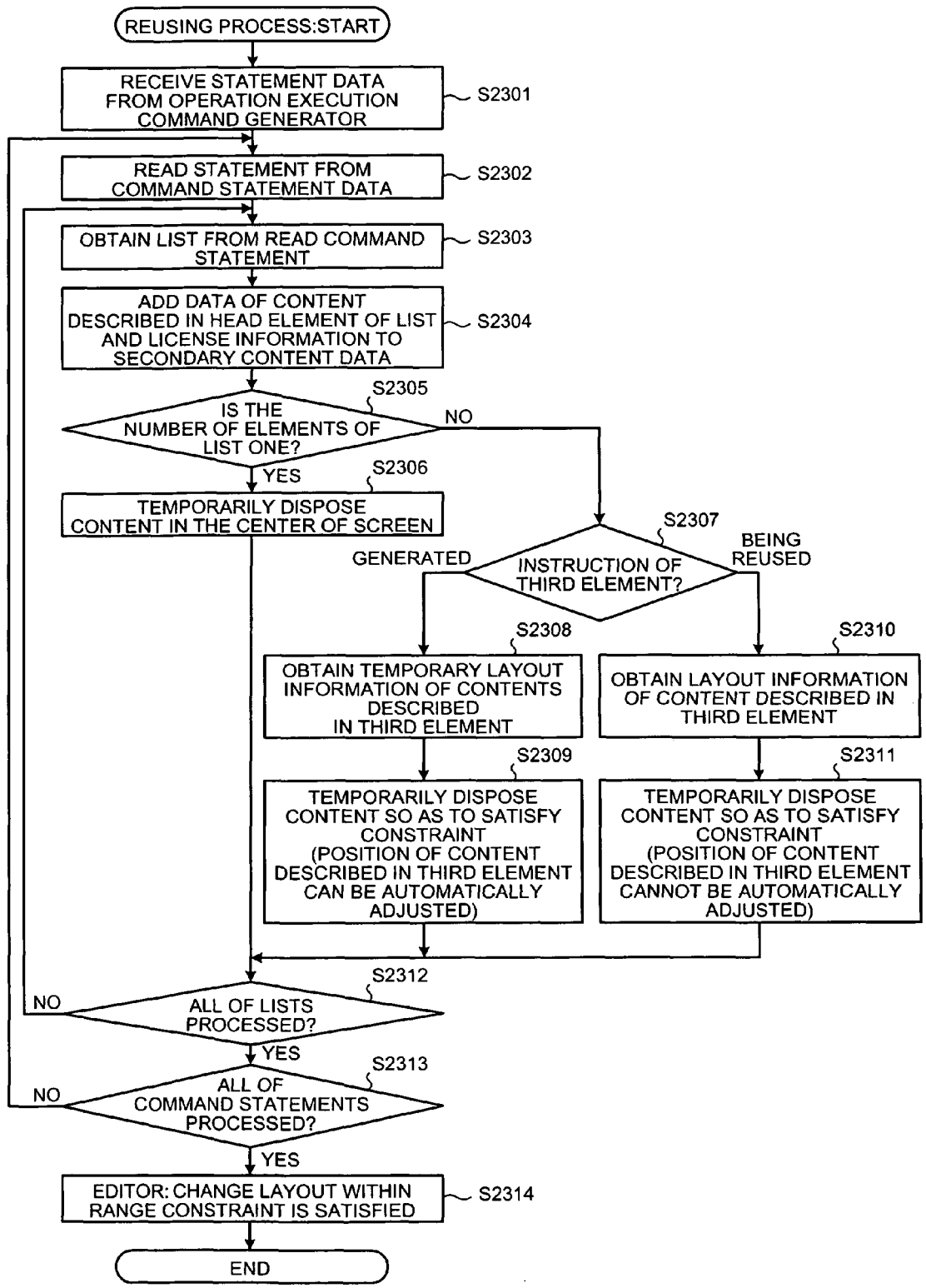
FIG. 23 is a flowchart that depicts a reusing process in the digital content editing apparatus according to the first embodiment.

FIG. 23 is a flowchart that depicts a general flow of the reusing process in step S1313 in FIG. 13.

First, the material reusing unit 105 receives the command statement data 120 generated by the operation execution command generator 106 (step S2301). Next, the material reusing unit 105 reads a statement from the received command statement data 120 (step S2302), further, obtains a list from the read statement (step S2303), and adds the data of the content described in the head element of the list and the license information to secondary content data (step S2304).

Next, the material reusing unit 105 determines whether the number of elements of the read list is one or not (step S2305) and, when the number of elements is one (YES in step S2305), temporarily disposes a content corresponding to the content ID as the element of the list in the center of the screen (step S2306). When the number of elements is not one (NO in step S2305), the material reusing unit 105 moves to a process of determining the type of the instruction of the third element (step S2307).

When the instruction of the third element is "generated (tmp)" ("generated" in step S2307), the material reusing unit 105 obtains temporary layout information of the content corresponding to the content ID described in the third element (step S2308) and temporarily disposes the content corresponding to the content ID described in the head element so as to satisfy the constraint described in the list (step S2309).

When the position of the temporarily disposed content corresponding to the content ID described in the third element is inappropriate to satisfy the constraint, the position of the content corresponding to the content ID described in the third element is automatically adjusted so as to satisfy the constraint.

When the instruction of the third element is "being reused (exist)" ("being reused" in step S2307), the material reusing unit 105 obtains the layout information of the content corresponding to the content ID described in the third element (step S2310) and temporarily disposes the content corresponding to the content ID disposed in the head element so as to satisfy the constraint described in the list (step S2311).

In this case, the content corresponding to the content ID described in the third element is reused and the layout is determined, so that the position of the content corresponding to the content ID described in the third element cannot be automatically adjusted.

Next, the material reusing unit 105 determines whether all of the lists have been processed or not (step S2312), when all of the lists have not been processed (NO in step S2312), reads the following list, and repeats the process (step S2303). When all of the lists have been processed (YES in step S2312), the material reusing unit 105 moves to a process of determining whether all of statements have been processed or not.

The material reusing unit 105 determines whether all of statements have been processed or not (step S2313), and when all of the statements have not be processed (NO in step S2313), obtains the following statement, and repeats the process (step S2302). When all of statements have been processed (YES in step S2313), the material reusing unit 105 moves to the following process.

After the content to be reused is disposed on the screen, the editor 121 changes the layout within the range satisfying the constraints among the contents according to a layout change instruction by the user (step S2314) and finishes the reusing process.

FIGS. 24 to 28 are explanatory diagrams that depict an example of content reuse executed on a multiple content shown in FIG. 5A according to the reusing process in the digital content editing apparatus 100 according to the first embodiment.

Figure 24:
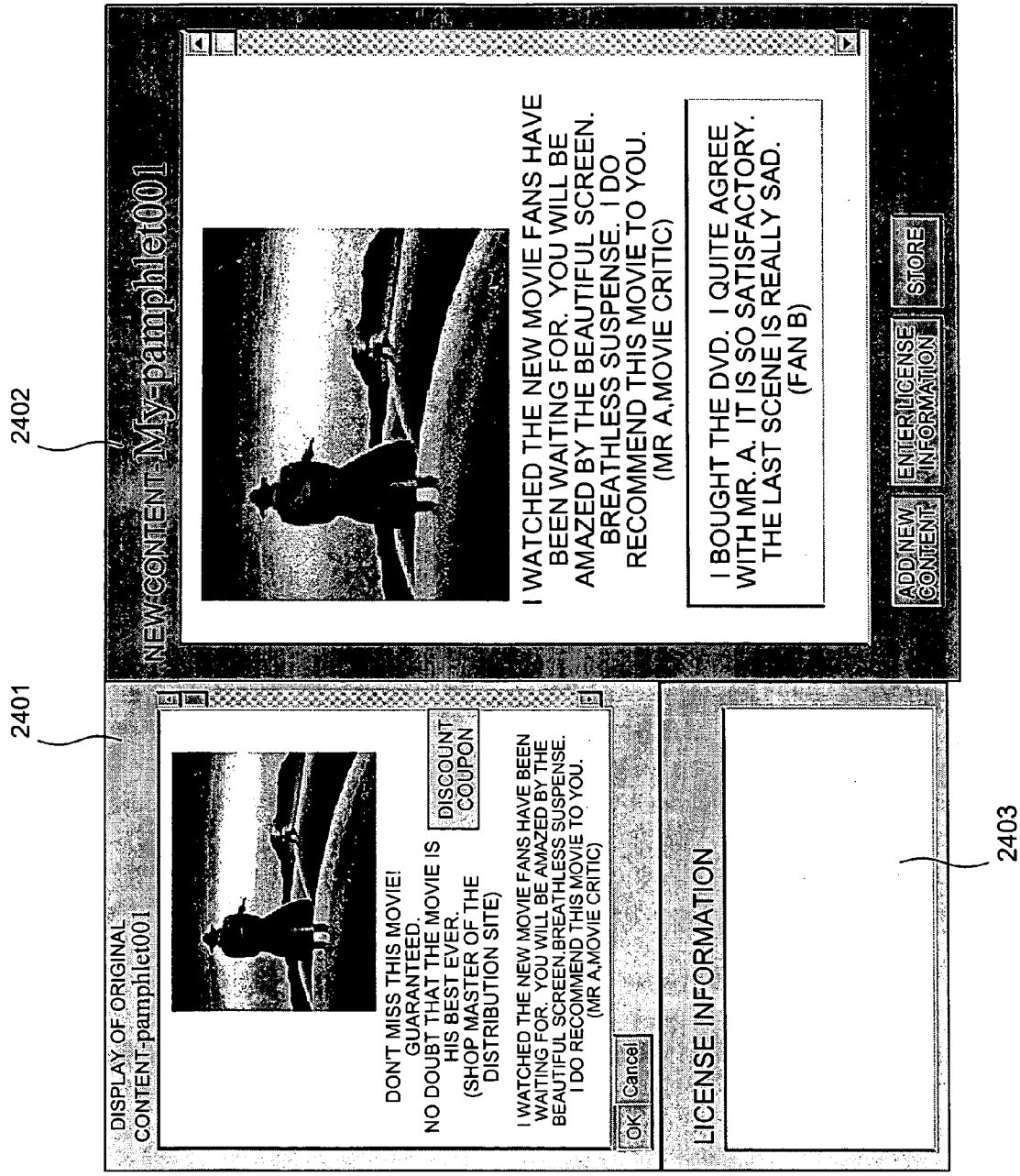
FIG. 24 is a schematic diagram that depicts an example of a content reusing screen in the digital content editing apparatus according to the first embodiment.

FIG. 24 is a schematic diagram that depicts data of the content reuse screen. The content reuse screen is constructed by an original content display area 2401 for displaying the original content 130, an edition area 2402 for adding a new content or reusing a material content, and a license information generation area 2403 for generating license information.

As explained above, the multiple content shown in FIG. 5A to be described below includes, as material contents, the motion picture 512 for advertisement, commentaries 513 and 514 on the motion picture 512 for advertisement, and the company A's coupon 515. An exclusive constraint is designated between the company A's coupon 515 and the company B's coupon 516, and a complementary constraint for displaying on the right side ("rightSide") is designated between the company's coupon 515 and the commentary 513. A complementary constraint of displaying "below" is designated between the commentaries 513 and 514 and the motion picture 512 for advertisement.

Figure 25:
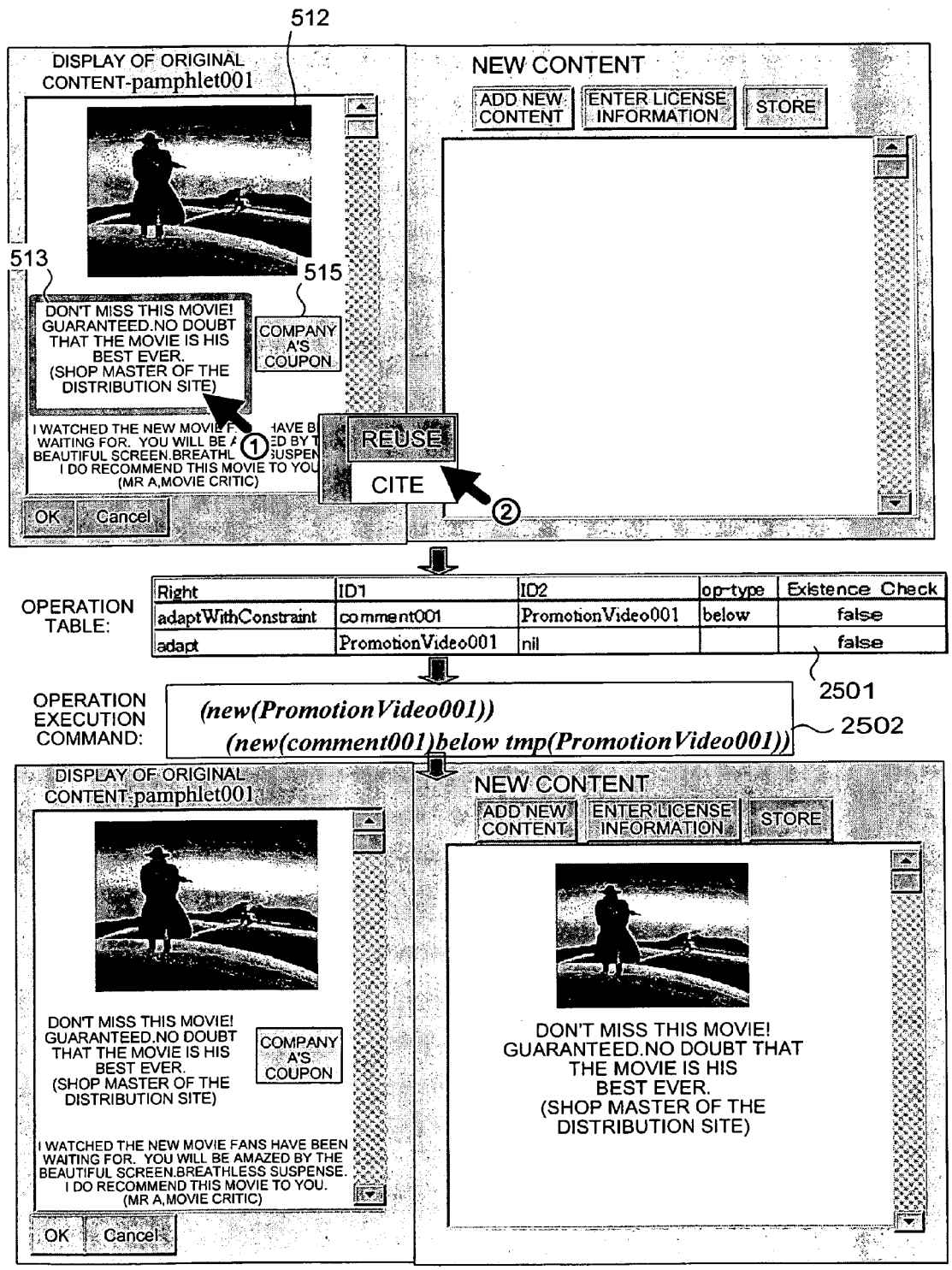
FIG. 25 is a schematic diagram that depicts an example of content reuse in the digital content editing apparatus according to the first embodiment.

FIG. 25 shows the details of an operation table 2501 and command statement data 2502 generated when reuse of the commentary 513 is instructed and the display of an edition area when the constraints exist The constraints are described in the license information of each material content. First, the license information is read by a reuse license process (step S1308) and the operation table 2501 show in FIG. 25 is generated. With reference to the table, after a table generating process (step S1504), condition table merging process (step 1505), and execution sequence generating process (step S1506) in the operation execution instructing generating process (step S1310), the command statement data 2502 shown in FIG. 25 is generated by the statement generating process (step S1507).

Specifically, as shown in the command statement data 2502, a motion picture "PromotionVideo001" for advertisement is newly generated, a commentary "comment001" is newly generated, and a statement of disposing the newly generated commentary below the motion picture for advertisement is generated. As a result, not only the commentary instructed to be reused but also a motion picture for advertisement are displayed in the edition area to satisfy the constraint.

Figure 26:
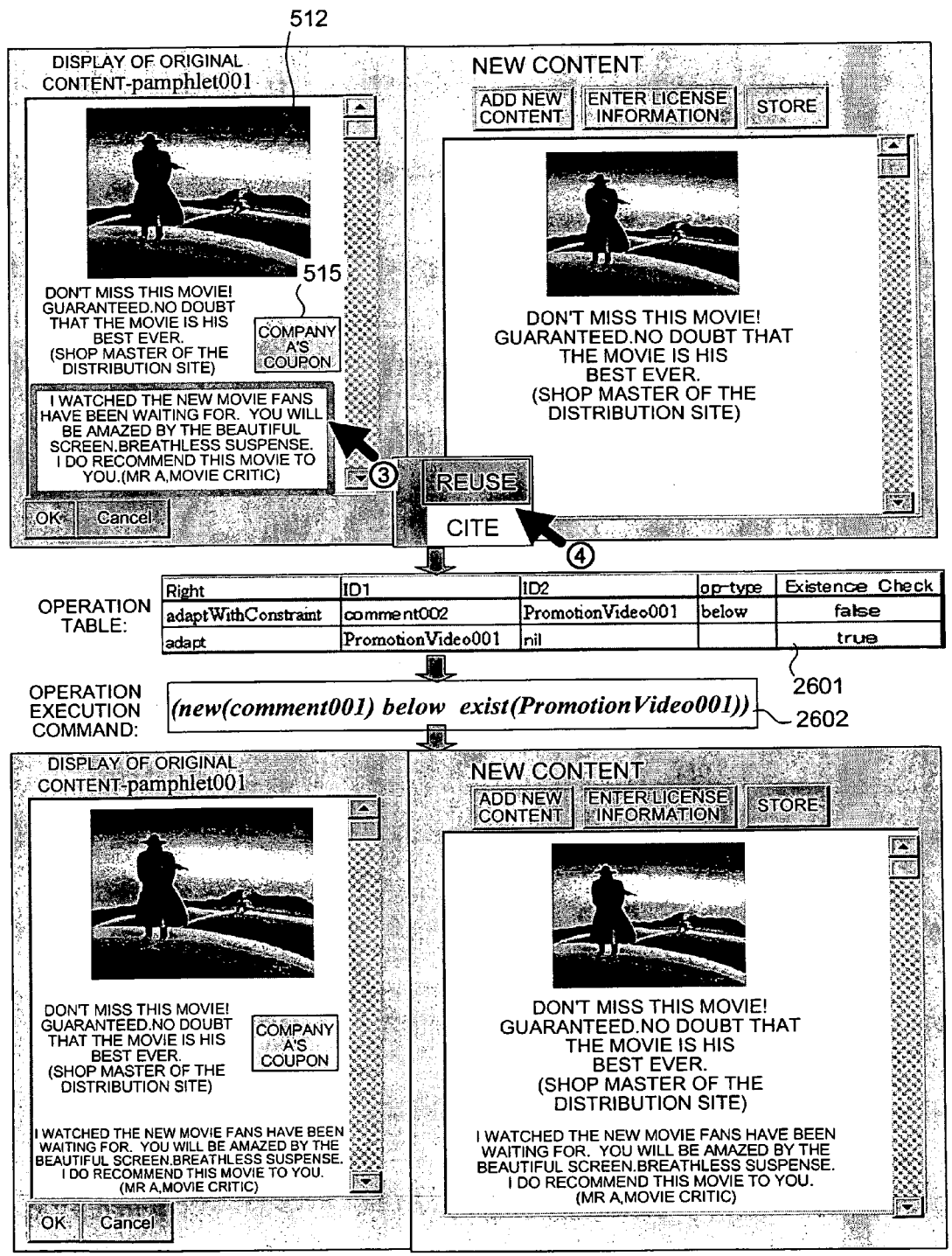
FIG. 26 is a schematic diagram that depicts an example of content reuse in the digital content editing apparatus according to the first embodiment.

FIG. 26 shows the details of an operation table 2601 and command statement data 2602 generated when reuse of the commentary 514 is instructed after the reusing operation shown in FIG. 25 and the display of the edition area.

In the example of FIG. 26, as shown in the command statement data 2602, the commentary "comment001" is newly generated, and a statement of disposing the newly generated commentary below a motion picture for advertisement reused ("exist") is generated. As a result, the commentary instructed to be reused is displayed below the motion picture for advertisement so as to satisfy the constraint.

Figure 27:
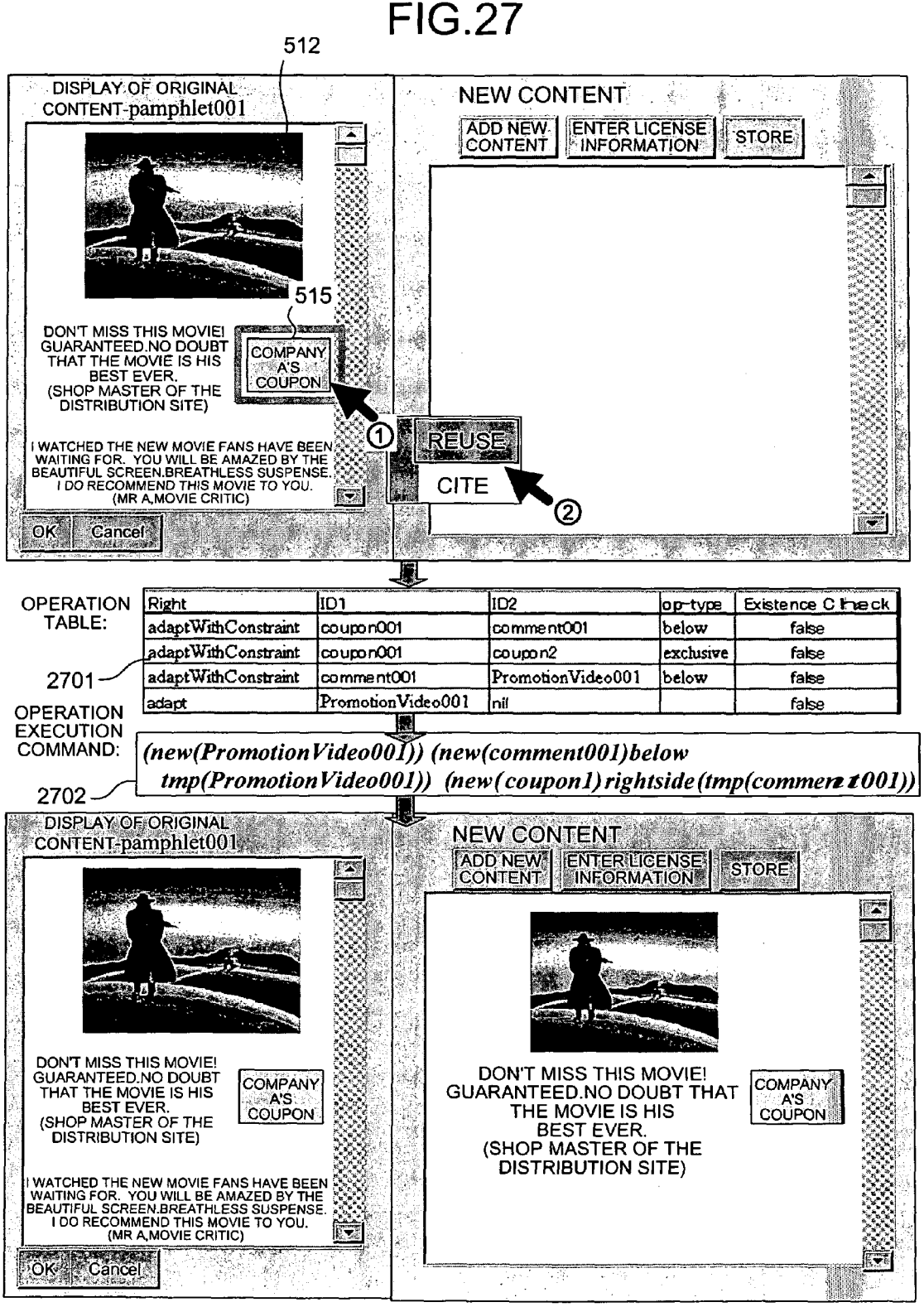
FIG. 27 is a schematic diagram that depicts an example of content reuse in the digital content editing apparatus according to the first embodiment.

FIG. 27 shows the details of an operation table 2701 and command statement data 2702 generated when reuse of the company A's coupon 515 is instructed and the display of an edition area when the constraint exists.

In the example of FIG. 27, as shown in the command statement data 2702, first, the motion picture "PromotionVideo001" for advertisement is newly generated. After that, the commentary "comment001" is newly generated and disposed below the motion picture for advertisement. The coupon "coupon1" is newly generated and a statement of disposing the newly generated coupon on the right side of the commentary is generated. As a result, not only the coupon instructed to be reused but also the motion picture for advertisement and the commentary are also displayed in the edition area in order to satisfy the constraint.

Figure 28:
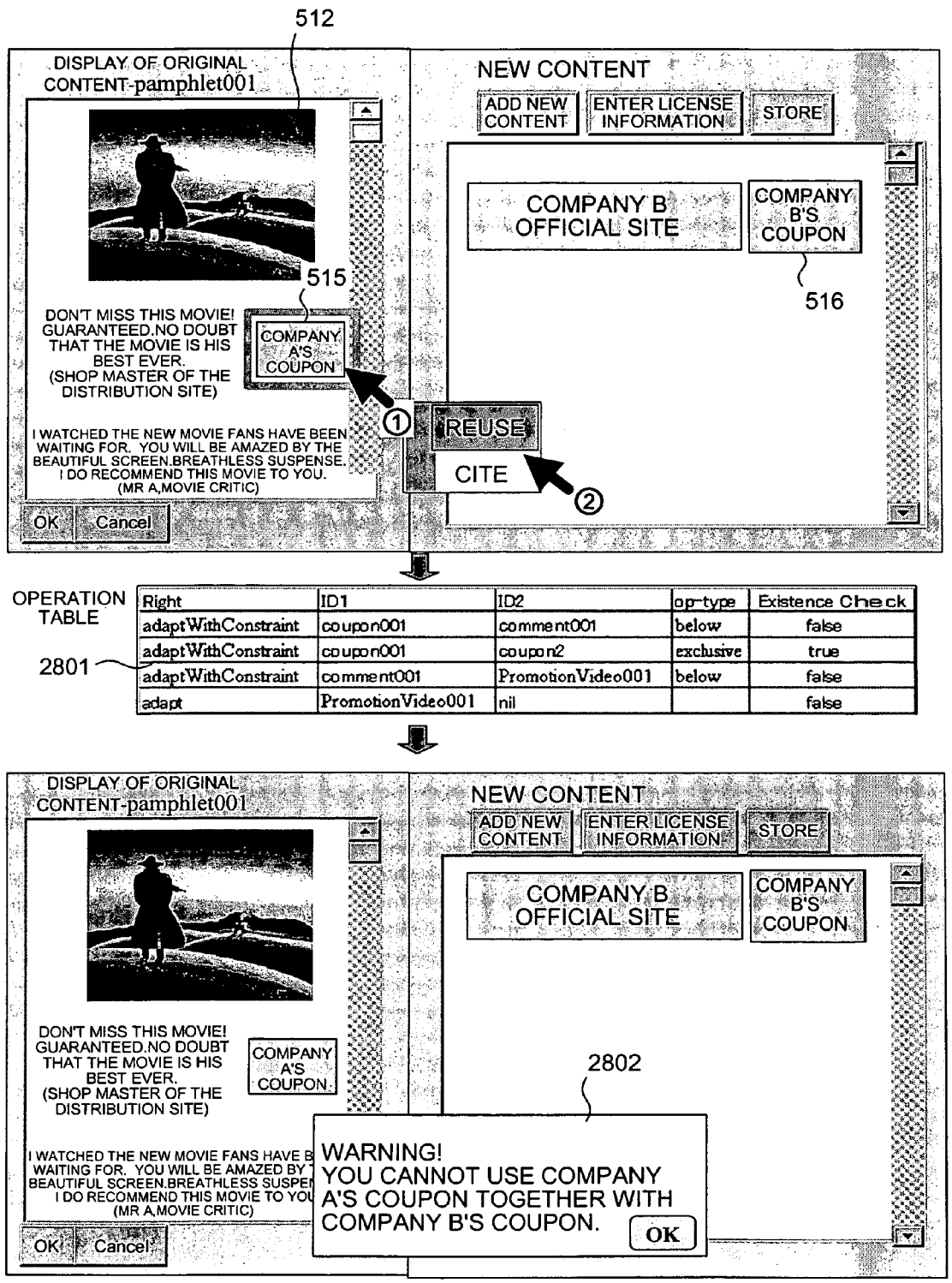
FIG. 28 is a schematic diagram that depicts an example of content reuse in the digital content editing apparatus according to the first embodiment.

FIG. 28 shows the details of the operation table 117 generated when reuse of the company A's coupon 515 is instructed when the constraint exists and the company B's coupon 516 is already reused and the display in the edition area.

In the example of FIG. 28, an operation table 2801 is generated. Since the company B's coupon 516 as a constraint object content under the exclusive constraint that is set for the company A's coupon 515 is already reused, the operation table is emptied by the exclusive constraint check (step S1503) (step S1603). The final command statement data is not generated and a warning message 2802 indicating that the material content cannot be reused is displayed on the screen (step S1312).

FIGS. 25 to 28 show that not only the reusing operation but also a citing operation can be designated. Citation is different from reuse and does not need permission of the author when citation is proper citation specified in the copyright act. Consequently, as a rule, a right different from that for an original content can be set as part of a secondary content for a cited content. For citation, the author sets license information different from that of reuse. Usually, a condition stricter than that for reuse is set for citation.

The digital content editing apparatus 100 may be constructed so as to use an original work according to such a grant of citation. For example, the author may specifically designate a method of clearly showing the source and the like based on the right of determining the indication of the author's name. In the case of an art piece, an image of the work may be displayed in monochromatic color, at low resolution, or with upper limit of a display size so that a copy of the work cannot be appreciated.

It is also possible to provide a mechanism of describing a rule of determining whether a work is processed mainly by citations or not in license information and making a check when a secondary content is completed based on the rule so that the content can be cited only when it is "proper citation" authorized by the author. For example, a rule such that a cited portion occupies less than 50 percent of a whole secondary content is described and, when the content is not according to the rule, the citation becomes invalid and is deleted from the secondary content.

In the digital content editing apparatus 100 according to the first embodiment, the original content 130 is rendered. At the time of reusing a material content selected by the user from material contents included in the rendered content, when a constraint is set, the material content can be reused according to the constraint. When the material content is singly reused, the author sets a constraint, thereby enabling a context among a plurality of material contents designated to be protected to be protected.

In a digital content editing apparatus according to a second embodiment, a material content to be reused is selected from material contents included in an original content without rendering of the original content. At the time of reusing the material content selected, a constraint described in license information of the original content is obtained and a digital content is edited so as to satisfy the obtained constraint.

Figure 29:
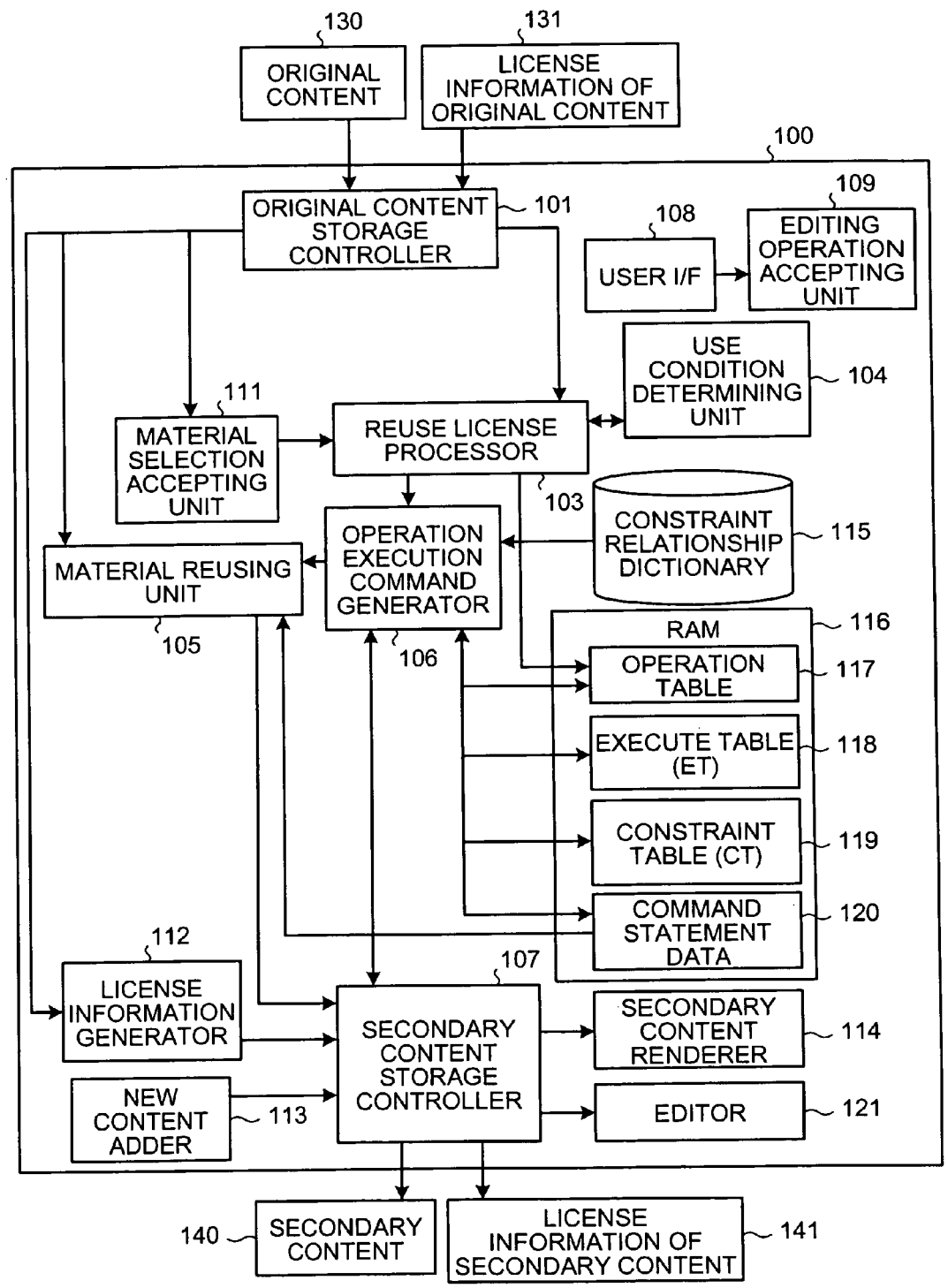
FIG. 29 is a block diagram that depicts the configuration of a digital content editing apparatus according to a second embodiment.

FIG. 29 is a block diagram that depicts the configuration of the digital content editing apparatus 100 according to the second embodiment. As shown in FIG. 29, the second embodiment is different from the first embodiment in that the rendering license processor 102 and the original content renderer 110 are deleted. The other configuration and functions are similar to those shown in FIG. 1 as the block diagram of the configuration of the first embodiment. The same reference numerals are given and the description is not repeated here.

In the digital content editing apparatus 100 according to the second embodiment, the material selection accepting unit 111 reads list information of material contents included in the original content 130 from the original content storage controller 101, allows selection of a material content desired to be reused by the user from the read list information, and sends the content ID of the material content, which selection is accepted, to the reuse license processor 103. The following reusing process is similar to that in the digital content editing apparatus 100 according to the first embodiment, and the description is not repeated here.

As explained above, in the digital content editing apparatus 100 according to the second embodiment, the user selects a material content to be reused from the material contents included in the original content without render the original content 130, and the selected material content can be reused. Therefore, it becomes unnecessary to determine whether rendering license of the original content 130 exists or not, and the process can be simplified. When a constraint is set, the material content can be reused according to the constraint.

Figure 30:
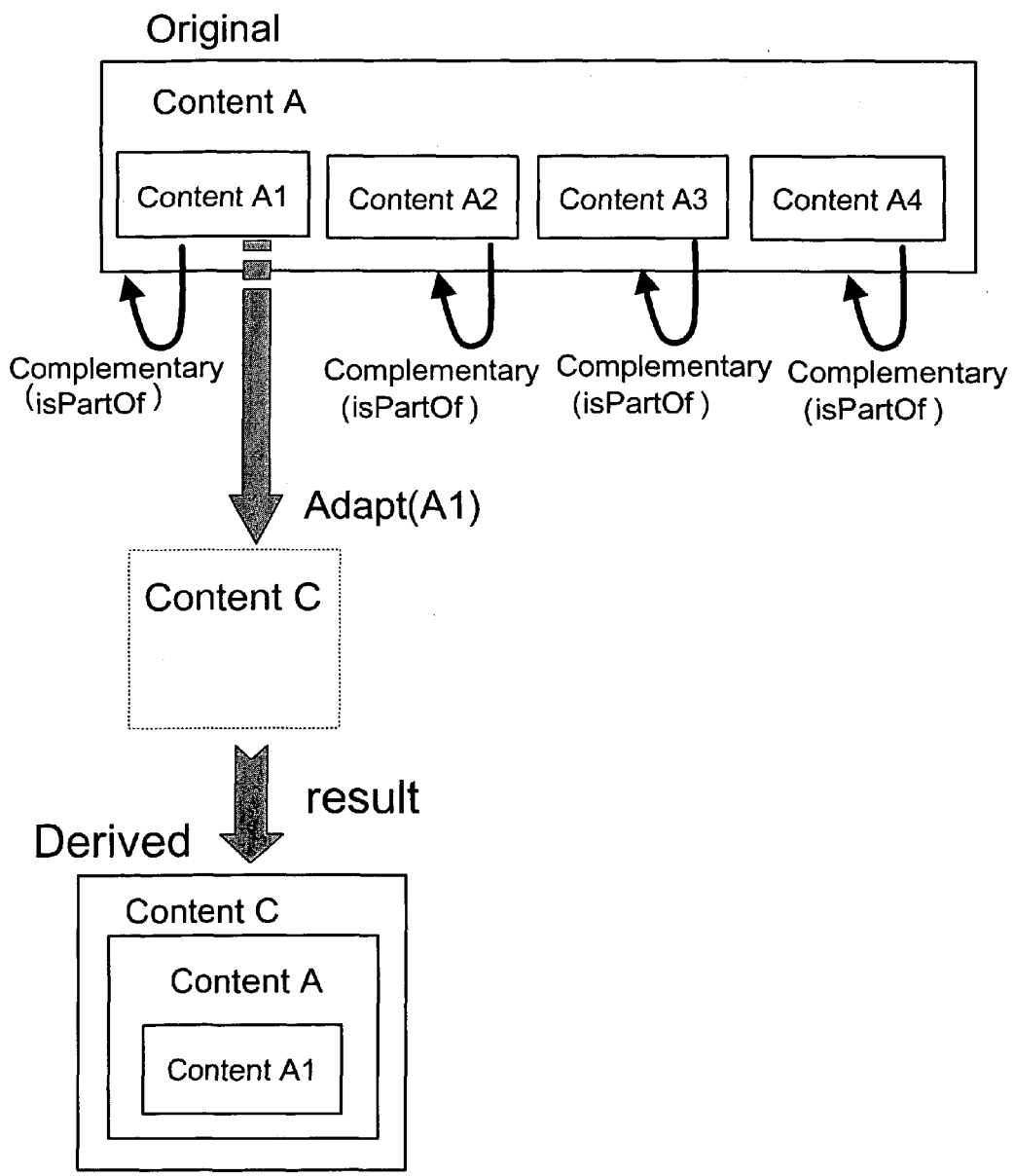
FIG. 30 is a schematic diagram that depicts an example of content reuse based on a structural constraint in the digital content editing apparatus according to the first or the second embodiment.

FIG. 30 is an explanatory diagram that depicts an example of content reuse executed based on the structural constraint in the digital content editing apparatus 100 according to the first or the second embodiment. In the example, an original content is an electronic book (Content A) constructed by four contents A1 to A4 as four sections. The electronic book can be reused on a section unit basis. Each section has a structural constraint of "isPartOf" with an electronic book content. Consequently, in the case of an instruction of reusing the content A1, the original content is reused as an electronic book (content A) having only the content A1 as a section.

The digital content editing apparatus 100 according to the first or the second embodiment has a controller such as a CPU, a storage such as a Read Only Memory (ROM) and a RAM, an external storing device such as an HDD and a CD drive, a display, and an input device such as a keyboard and a mouse. The digital content editing apparatus 100 has thus a hardware configuration using a common computer.

A digital content editing computer program to be executed by the digital content editing apparatus 100 according to the first or the second embodiment is provided by being recorded in a file of an installable format or an executable format on a computer-readable recording medium such as a CD-ROM, a flexible disk (FD), a CD-R, or a DVD.

The digital content editing computer program to be executed by the digital content editing apparatus 100 according to the first or the second embodiment may be provided by being stored on a computer connected to a network such as the Internet and downloaded via the network. The digital content editing computer program executed by the digital content editing apparatus 100 according to the first or the second embodiment may be provided or distributed via a network such as the Internet.

Further, the digital content editing computer program according to the first or the second embodiment may be provided by being previously stored in a ROM or the like.

The digital content editing computer program to be executed by the digital content editing apparatus 100 according to the first or the second embodiment has a module configuration including the above-described units (original content storage controller, rendering license processor, reuse license processor, use condition determining unit, material reusing unit, operation execution command generator, secondary content storage controller, editing operation accepting unit, original content renderer, material selection accepting unit, license information generator, new content adder, secondary content renderer, and editor). As actual hardware, a CPU (Processor) reads the digital content editing computer program from the storing medium and executes it, thereby loading the units onto a main storage. Thus the original content storage controller, the rendering license processor, the reuse license processor, the use condition determining unit, the material reusing unit, the operation execution command generator, the secondary content storage controller, the editing operation accepting unit, the original content renderer, the material selection accepting unit, the license information generator, the new content adder, the secondary content renderer, and the editor are generated on the main storage.

As explained above, the digital content editing apparatus, the digital content editing method, and the digital content editing computer program according to the present invention are suitable for a digital content editing apparatus reusing a digital content based on license information defining a grant of a reusing operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital content editing apparatus that edits a content having associated license information or multiple content including a plurality of the contents, comprising:
  a reuse license processor configured to obtain a spatial constraint from the license information defining a grant for a reusing operation of the content or the multiple content given an instruction to reuse, the spatial constraint indicating a positional relation on a reuse screen at the time of using the content or the multiple content together with a constraint object content or a multiple constraint object content other than the content or the multiple content given the instruction to reuse;
  an instruction generator configured to generate an operation execution instruction of disposing the content or the multiple content according to the positional relation on the reuse screen defined in the spatial constraint obtained by the reuse license processor;
  a reusing unit configured to reuse the content or the multiple content based on the operation execution instruction generated by the instruction generator; and
  an editor configured to edit the content or the multiple content reused by the reusing unit.

2. A digital content editing apparatus that edits a content having associated license information or multiple content including a plurality of the contents, comprising:
  a reuse license processor configured to obtain a structural constraint from the license information defining a grant for a reusing operation of the content or the multiple content given an instruction to reuse, the structural constraint indicating a structural inclusive relation at the time of using the content or the multiple content together with a constraint object content or a multiple constraint object content other than the content or the multiple content given the instruction to reuse;
  an instruction generator configured to generate an operation execution instruction of disposing the content or the multiple content according to the structural inclusive relation defined in the structural constraint obtained by the reuse license processor;
  a reusing unit configured to reuse the content or the multiple content based on the operation execution instruction generated by the instruction generator; and
  an editor configured to edit the content or the multiple content reused by the reusing unit.

3. A digital content editing apparatus that edits a content having associated license information or multiple content including a plurality of the contents, comprising:
  a reuse license processor configured to obtain an exclusive constraint indicative of a relation of inhibiting the content or the multiple content from being used together with a constraint object content or a multiple constraint object content other than the content or the multiple content given the instruction to reuse, from the license information defining a grant for a reusing operation of the content or the multiple content given the instruction to reuse;
  an instruction generator configured to generate an operation execution instruction of exclusively reusing the content or the multiple content and the constraint object content or the multiple constraint object content according to the exclusive constraint obtained by the reuse license processor;
  a reusing unit configured to reuse the content or the multiple content based on the operation execution instruction generated by the instruction generator; and
  an editor configured to edit the content or the multiple content reused by the reusing unit.

4. The digital content editing apparatus according to claim 3, wherein the instruction generator is configured to generate an operation execution instruction of not reusing the content or the multiple content having the exclusive constraint when the constraint object content or the multiple constraint object content inhibited to be used together with the content or the multiple content is reused, and to generate an operation execution instruction of not reusing the constraint object content or the multiple constraint object content inhibited to be used together with the content or the multiple content when the content or the multiple content having the exclusive constraint is reused according to the exclusive constraint obtained by the reuse license processor.

5. A digital content editing method of editing a content having associated license information or a multiple content including a plurality of contents, comprising:
   obtaining a spatial constraint from the license information defining a grant for a reusing operation of the content or the multiple content given an instruction to reuse, the spatial constraint indicating a positional relation on a reuse screen at the time of using the content or the multiple content together with a constraint object content or a multiple constraint object content other than the content or the multiple content given the instruction to reuse;
   generating, by a processor, an operation execution instruction of disposing the content or the multiple content according to the positional relation on the reuse screen defined in the spatial constraint obtained by the reuse license processing;
   reusing the content or the multiple content based on the operation execution instruction generated by the operation execution instruction generation; and
   editing the content or the multiple content reused by the material reusing.

6. A digital content editing computer program product having a non-transitory computer readable medium including programmed instructions for editing a content having associated license information or a multiple content including a plurality of the contents, wherein the instructions, when executed by a computer, cause the computer to perform:
   a reuse license processing that obtains a spatial constraint from the license information defining a grant for a reusing operation of the content or the multiple content given an instruction to reuse, the spatial constraint indicating a positional relation on a reuse screen at the time of using the content or the multiple content together with a constraint object content and a multiple constraint object content other than the content or the multiple content given the instruction to reuse;
   an operation execution instruction generation that generates an operation execution instruction of disposing the content or the multiple content according to the positional relation on the reuse screen defined in the spatial constraint obtained by the reuse license processing;
   a material reusing that reuses the content or the multiple content based on the operation execution instruction generated by the operation execution instruction generation; and
   an editing that edits the content or the multiple content reused by the material reusing.

7. A digital content editing computer program product having a non-transitory computer readable medium including programmed instructions for editing a content having associated license information or a multiple content including a plurality of the contents, wherein the instructions, when executed by a computer, cause the computer to perform:
   a reuse license processing that obtains a structural constraint from the license information defining a grant for a reusing operation of the content or the multiple content given an instruction to reuse, the structural constraint indicating a structural inclusive relation at the time of using the content or the multiple content together with a constraint object content or a multiple constraint object content other than the content or the multiple content given the instruction to reuse;
   an operation execution instruction generation that generates an operation execution instruction of disposing the content or the multiple content according to the structural inclusive relation defined in the structural constraint obtained by the reuse license processing;
   a material reusing that reuses the content or the multiple content based on the operation execution instruction generated by the operation execution instruction generation; and
   an editing that edits the content or the multiple content reused by the material reusing.

8. A digital content editing computer program product having a non-transitory computer readable medium including programmed instructions for editing a content having associated license information or a multiple content including a plurality of the contents, wherein the instructions, when executed by a computer, cause the computer to perform:
   a reuse license processing that obtains an exclusive constraint indicative of a relation of inhibiting the content or the multiple content from being used together with a constraint object content or a multiple constraint object content other than the content or the multiple content given the instruction to reuse, from the license information defining a grant for a reusing operation of the content or the multiple content given the instruction to reuse;
   an operation execution instruction that generates an operation execution instruction of exclusively reusing the content or the multiple content and the constraint object content or the multiple constraint object content according to the exclusive constraint obtained by the reuse license processing;
   a material reuse step that reuses the content or the multiple content based on the operation execution instruction generated by the operation execution instruction; and
   an editing step that edits the content or the multiple content reused by the material reuse step.

9. The digital content editing computer program product according to claim 8, wherein the operation execution instruction generation generates an operation execution instruction of not reusing the content or the multiple content having the exclusive constraint when the constraint object content or the multiple constraint object content inhibited to be used together with the content or the multiple content is reused, and generates an operation execution instruction of not reusing the constraint object content or the multiple constraint object content inhibited to be used together with the content or the multiple content when the content or the multiple content having the exclusive constraint is reused according to the exclusive constraint obtained by the reuse license processing.

10. A non-transitory recording medium, on which a digital content editing computer program for editing a content having associated license information or a multiple content including a plurality of contents is recorded, the computer program making a computer execute:
   a reuse license processing that obtains a spatial constraint from the license information defining a grant for a reusing operation of the content or the multiple content given an instruction to reuse, the spatial constraint indicating a positional relation on a reuse screen at the time of using the content or the multiple content together with a constraint object content or a multiple constraint object content other than the content or the multiple content given the instruction to reuse;
   an operation execution instruction generation that generates an operation execution instruction of disposing the content or the multiple content according to the positional relation on the reuse screen defined in the spatial constraint obtained by the reuse license processing;

a material reusing that reuses the content or the multiple content based on the operation execution instruction generated by the operation execution instruction generation; and an editing that edits the content or the multiple content reused by the material reusing.

11. A digital content editing method of editing a content having associated license information or a multiple content including a plurality of contents, comprising:

obtaining an exclusive constraint indicative of a relation of inhibiting the content or the multiple content from being used together with a constraint object content or a multiple constraint object content other than the content or the multiple content given the instruction to reuse, from the license information defining a grant for a reusing operation of the content or the multiple content given the instruction to reuse;

generating, by a processor, an operation execution instruction of exclusively reusing the content or the multiple content and the constraint object content or the multiple constraint object content according to the exclusive constraint obtained by the reuse license processing;

reusing the content or the multiple content based on the operation execution instruction generated by the operation execution instruction generation; and editing the content or the multiple content reused by the material reuse.

12. A non-transitory recording medium, on which a digital content editing computer program for editing a content having associated license information or a multiple content including a plurality of the contents is recorded, the computer program making a computer execute:

a reuse license processing that obtains an exclusive constraint indicative of a relation of inhibiting the content or the multiple content from being used together with a constraint object content or a multiple constraint object content other than the content or the multiple content given the instruction to reuse, from the license information defining a grant for a reusing operation of the content or the multiple content given the instruction to reuse;

an operation execution instruction that generates an operation execution instruction of exclusively reusing (1) the content or the multiple content, and (2) the constraint object content or the multiple constraint object content according to the exclusive constraint obtained by the reuse license processing;

a material reuse step that reuses the content or the multiple content based on the operation execution instruction generated by the operation execution instruction; and an editing step that edits the content or the multiple content reused by the material reuse step.

13. A digital content editing method of editing a content having associated license information or a multiple content including a plurality of contents, comprising:

obtaining a structural constraint from the license information defining a grant for a reusing operation of the content or the multiple content given an instruction to reuse, the structural constraint indicating a structural inclusive relation at the time of using the content or the multiple content together with a constraint object content or a multiple constraint object content other than the content or the multiple content given the instruction to reuse;

generating, by a processor, an operation execution instruction of disposing the content or the multiple content according to the structural inclusive relation defined in the structural constraint obtained by the reuse license processing;

reusing the content or the multiple content based on the operation execution instruction generated by the operation execution instruction generation; and editing the content or the multiple content reused by the material reusing.

14. A non-transitory recording medium, on which a digital content editing computer program for editing a content having associated license information or a multiple content including a plurality of contents is recorded, the computer program making a computer execute;

a reuse license processing that obtains a structural constraint from the license information defining a grant for a reusing operation of the content or the multiple content given an instruction to reuse, the structural constraint indicating a structural inclusive relation at the time of using the content or the multiple content together with a constraint object content or a multiple constraint object content other than the content or the multiple content given the instruction to reuse;

an operation execution instruction generation that generates an operation execution instruction of disposing the content or the multiple content according to the structural inclusive relation defined in the structural constraint obtained by the reuse license processing;

a material reusing that reuses the content or the multiple content based on the operation execution instruction generated by the operation execution instruction generation; and an editing that edits the content or the multiple content reused by the material reusing.

* * * * *